US011945095B2

(12) United States Patent
Hurley

(10) Patent No.: US 11,945,095 B2
(45) **Date of Patent: *Apr. 2, 2024**

(54) INTERCHANGEABLE AND INTERCONNECTABLE TOOL ORGANIZING DEVICE

(71) Applicant: Jonathan Hurley, Columbia Falls, MT (US)

(72) Inventor: Jonathan Hurley, Columbia Falls, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,138

(22) Filed: Feb. 24, 2023

(65) Prior Publication Data

US 2023/0294269 A1 Sep. 21, 2023

Related U.S. Application Data

(63) Continuation of application No. 17/446,003, filed on Aug. 26, 2021, now Pat. No. 11,590,644, which is a (Continued)

(51) Int. Cl.
*B25H 3/00* (2006.01)
*B25H 3/04* (2006.01)
(Continued)

(52) U.S. Cl.
CPC ............... *B25H 3/04* (2013.01); *B25H 3/003* (2013.01); *H01F 7/0252* (2013.01); *B25H 3/022* (2013.01)

(58) Field of Classification Search
CPC .......... B25H 3/003; B25H 3/04; B25H 3/022; B25H 3/06; B25H 3/00; H01F 7/0252; A61L 2/26; A61B 50/20
See application file for complete search history.

(56) References Cited

U.S. PATENT DOCUMENTS

| | | | |
|---|---|---|---|
| 1,809,450 | A | 6/1931 | Platt |
| 1,900,915 | A | 3/1933 | Costello |

(Continued)

FOREIGN PATENT DOCUMENTS

| | | | |
|---|---|---|---|
| CN | 205904991 U | 1/2017 | |
| GB | 2 420 963 A | 6/2006 | |

(Continued)

OTHER PUBLICATIONS

Dhartv, "A Must Buy for Anyone who Wants to Organize Their Wrenches!!! E-Z Red Magnetic Wrench Rack", retrieved from the Internet <URL:www.youtube.com/watch?v=d3z6HwUOv6M>, 0:14-0:24, 0:38-0:46, 2:00-2:06. 2:10-2:24. 3:35, 3:55-4:096 Apr. 2017 (Transcript and stills provided).

(Continued)

*Primary Examiner* — Kimberley S Wright
(74) *Attorney, Agent, or Firm* — Christensen O'Connor Johnson Kindness PLLC

(57) ABSTRACT

A custom tool accessory to hold a tool, the custom tool accessory including a body, at least one tongue disposed at a first side of the body, at least one tongue receiving groove disposed at a second side of the body opposite from the first side of the body, and a tool holding portion disposed on the body to hold the tool. At least one magnet is attached to the underside of a metallic base plate that is in turn secured to the underside of the body. A retainer surrounds the at least one magnet and also underlies the area of the bottom of the base plate that is not covered by the at least one magnet.

7 Claims, 31 Drawing Sheets

Related U.S. Application Data continuation of application No. 16/721,126, filed on Dec. 19, 2019, now Pat. No. 11,103,989, which is a continuation-in-part of application No. 16/041,806, filed on Jul. 22, 2018, now Pat. No. 11,110,589, and a continuation-in-part of application No. 15/622,169, filed on Jun. 14, 2017, now abandoned, said application No. 16/041,806 is a continuation of application No. 15/622,169, filed on Jun. 14, 2017.

(51) Int. Cl.

| | |
|---|---|
| ***H01F 7/02*** | (2006.01) |
| *B25H 3/02* | (2006.01) |

(56) References Cited

U.S. PATENT DOCUMENTS

| | | | |
|---|---|---|---|
| 1,922,102 | A | 8/1933 | Kroecker |
| 2,066,851 | A | 1/1937 | Noyes et al. |
| 2,068,308 | A | 1/1937 | Zerver |
| 2,119,217 | A | 5/1938 | Rocchi |
| 2,371,433 | A | 3/1945 | Davis |
| 2,541,597 | A | 2/1951 | Midling |
| 2,580,099 | A | 12/1951 | Jaeger |
| 2,619,829 | A | 12/1952 | Tatum |
| 2,907,137 | A | 10/1959 | Ehrmann |
| 3,370,696 | A | 2/1968 | Groe |
| 4,114,241 | A | 9/1978 | Bisping |
| RE30,435 | E | 11/1980 | Fukao |
| 4,286,952 | A | 9/1981 | Roche |
| 4,305,221 | A | 12/1981 | Chatani |
| 4,306,697 | A | 12/1981 | Mathews |
| 4,406,368 | A | 9/1983 | Hermes |
| 4,410,095 | A | 10/1983 | Dembicks |
| 4,621,738 | A | 11/1986 | DeLucchi |
| 4,770,297 | A | 9/1988 | Chang |
| 4,928,821 | A | 5/1990 | Belko, Jr. |
| 5,054,636 | A | 10/1991 | Netzer |
| 5,080,230 | A | 1/1992 | Winnard |
| 5,217,115 | A | 6/1993 | Purkapile |
| 5,284,245 | A | 2/1994 | Slivon et al. |
| 5,301,822 | A | 4/1994 | Coleman et al. |
| 5,313,181 | A | 5/1994 | Negus |
| 5,320,223 | A | 6/1994 | Allen |
| 5,378,184 | A | 1/1995 | Bro et al. |
| 5,398,823 | A | 3/1995 | Anders |
| 5,407,063 | A | 4/1995 | Warner et al. |
| 5,409,560 | A | 4/1995 | Hammer et al. |
| 5,512,165 | A | 4/1996 | Liu |
| 5,520,285 | A | 5/1996 | Mursch et al. |
| 5,535,881 | A | 7/1996 | Krivec |
| 5,542,320 | A | 8/1996 | Vasichek et al. |
| 5,544,396 | A | 8/1996 | Mekyska |
| 5,544,747 | A | 8/1996 | Horn |
| 5,551,320 | A | 9/1996 | Horobec et al. |
| 5,551,795 | A | 9/1996 | Engibarov |
| 5,638,964 | A | 6/1997 | Ernst |
| 5,645,177 | A | 7/1997 | Lin |
| 5,660,276 | A | 8/1997 | Winnard |
| 5,669,516 | A | 9/1997 | Horn |
| 5,695,165 | A | 12/1997 | Moriarty |
| 5,743,394 | A | 4/1998 | Martin |
| 5,760,668 | A | 6/1998 | Testa et al. |
| 5,833,465 | A | 11/1998 | Jarzewiak |
| 5,855,285 | A | 1/1999 | Laird et al. |
| 5,884,782 | A | 3/1999 | Dembicks |
| 5,979,675 | A | 11/1999 | Moriarty |
| 6,044,971 | A | 4/2000 | Esposito et al. |
| 6,047,824 | A | 4/2000 | Winnard |
| 6,047,827 | A | 4/2000 | Huang |
| 6,073,766 | A | 6/2000 | Winnard |
| 6,098,799 | A | 8/2000 | Lee |
| 6,109,569 | A | 8/2000 | Sakaida |
| 6,237,767 | B1 | 5/2001 | Lee |
| 6,390,298 | B1 | 5/2002 | Garro |
| 6,405,864 | B1 | 6/2002 | Streich et al. |
| 6,415,922 | B1 | 7/2002 | Lee |
| 6,450,338 | B1 | 9/2002 | Chen |
| 6,516,948 | B1 | 2/2003 | Caballero |
| 6,595,735 | B1 | 7/2003 | Lee |
| 6,637,082 | B1 | 10/2003 | Chang |
| 6,698,600 | B1 | 3/2004 | Lee |
| 6,719,155 | B1 | 4/2004 | Chang |
| 6,811,127 | B1 | 11/2004 | Shiao |
| 6,827,275 | B2 | 12/2004 | Allen |
| 6,868,967 | B2 | 3/2005 | Lam |
| 6,932,223 | B1 | 8/2005 | Lee et al. |
| 7,172,079 | B1 | 2/2007 | Shiao |
| 7,185,770 | B1 | 3/2007 | Roten |
| 7,246,704 | B2 | 7/2007 | Brunson et al. |
| 7,286,059 | B2 | 10/2007 | Drake |
| 7,322,470 | B2 | 1/2008 | Brunson |
| 7,424,958 | B1 | 9/2008 | Eley |
| 7,510,092 | B2 | 3/2009 | Sholem |
| 7,533,852 | B2 | 5/2009 | Stigler |
| 7,622,682 | B2 | 11/2009 | Malin |
| 7,735,645 | B2 | 6/2010 | Joyce et al. |
| 7,837,033 | B2 | 11/2010 | Schein et al. |
| 7,905,354 | B1 | 3/2011 | Geibel |
| 8,020,259 | B2 | 9/2011 | Ho et al. |
| 8,118,162 | B1 | 2/2012 | McEwin et al. |
| 8,181,780 | B1 | 5/2012 | Guffey et al. |
| 8,272,628 | B2 | 9/2012 | Winnard |
| 8,308,408 | B2 | 11/2012 | Gaudette |
| 8,336,709 | B1 | 12/2012 | Geibel |
| 8,403,155 | B1 | 3/2013 | Kao |
| 8,505,720 | B2 | 8/2013 | Huang |
| 8,505,748 | B2 | 8/2013 | Jones et al. |
| 8,739,453 | B1 | 6/2014 | Conner |
| 9,205,553 | B2 | 12/2015 | Ou |
| 9,238,301 | B2 | 1/2016 | Streich et al. |
| 9,962,827 | B2 | 5/2018 | Kao |
| 10,022,857 | B2 | 7/2018 | Kao |
| 10,052,754 | B1 | 8/2018 | Coleman, Jr. et al. |
| 10,099,363 | B1 | 10/2018 | Hsieh |
| 10,213,913 | B2 | 2/2019 | Pang |
| 10,279,467 | B2 | 5/2019 | Ou |
| 10,335,664 | B2 | 7/2019 | Jacques |
| 10,625,411 | B2 | 4/2020 | Tesoroni |
| 10,675,750 | B1 | 6/2020 | Winnard et al. |
| 10,842,264 | B1 | 11/2020 | Savryha et al. |
| 11,103,989 | B2 | 8/2021 | Hurley |
| 11,110,589 | B2 | 9/2021 | Hurley |
| 2003/0016993 | A1 | 1/2003 | Chen |
| 2003/0141266 | A1 | 7/2003 | Lin |
| 2004/0140356 | A1 | 7/2004 | Allen |
| 2004/0140362 | A1 | 7/2004 | Allen |
| 2004/0238466 | A1 | 12/2004 | Shiao |
| 2004/0256335 | A1 | 12/2004 | Sholem |
| 2005/0221664 | A1 | 10/2005 | Winnard |
| 2005/0258059 | A1 | 11/2005 | Joyce et al. |
| 2006/0065557 | A1 | 3/2006 | Brunson |
| 2006/0070900 | A1 | 4/2006 | Brunson et al. |
| 2006/0082466 | A1 | 4/2006 | Drake |
| 2006/0091986 | A1 | 5/2006 | Coleman, Jr. et al. |
| 2006/0234846 | A1 | 10/2006 | Tucker |
| 2007/0144986 | A1 | 6/2007 | Hill |
| 2008/0251476 | A1 | 10/2008 | Shiao |
| 2009/0072029 | A1 | 3/2009 | Martin |
| 2009/0101532 | A1 | 4/2009 | Huot |
| 2009/0166305 | A1 | 7/2009 | Hsieh |
| 2009/0218302 | A1 | 9/2009 | Winnard |
| 2009/0255891 | A1 | 10/2009 | Lanning |
| 2011/0204051 | A1 | 8/2011 | Pawl |
| 2014/0083886 | A1 | 3/2014 | Winterrowd et al. |
| 2015/0122750 | A1 | 5/2015 | Kao |
| 2015/0202767 | A1 | 7/2015 | Kao |
| 2015/0251310 | A1 | 9/2015 | Ou |
| 2015/0252827 | A1 | 9/2015 | Ou |
| 2015/0273683 | A1 | 10/2015 | Ou |
| 2015/0328768 | A1 | 11/2015 | Martin |
| 2016/0016306 | A1 | 1/2016 | Haddon et al. |
| 2016/0121478 | A1 | 5/2016 | Schein et al. |
| 2016/0214254 | A1 | 7/2016 | Ou |

(56) References Cited

U.S. PATENT DOCUMENTS

| | | | |
|---|---|---|---|
| 2017/0190046 | A1 | 7/2017 | Winnard |
| 2017/0274522 | A1 | 9/2017 | Kao |
| 2017/0341218 | A1 | 11/2017 | Maruzzo et al. |
| 2018/0104812 | A1 | 4/2018 | Wacker |
| 2018/0137789 | A1 | 5/2018 | Murray, III et al. |
| 2018/0232577 | A1 | 8/2018 | Lipsey et al. |
| 2018/0326573 | A1 | 11/2018 | Tesoroni |
| 2018/0353830 | A1 | 12/2018 | Jacques |
| 2018/0361563 | A1 | 12/2018 | Hurley |
| 2018/0361564 | A1 | 12/2018 | Hurley |
| 2019/0061139 | A1 | 2/2019 | Kao |
| 2019/0275664 | A1 | 9/2019 | Pingitore |
| 2020/0122315 | A1 | 4/2020 | Hurley |

FOREIGN PATENT DOCUMENTS

| | | | |
|---|---|---|---|
| WO | 94/14683 | A1 | 7/1994 |
| WO | 2015/117180 | A1 | 8/2015 |

OTHER PUBLICATIONS

Toolbox Widget, "The Toolbox Widget", retrieved from the Internet <URL:www.youtube.com/watch?v=L4cdCFAOg2o>, entire video, Aug. 5, 2017 (Transcript provided and stills provided).

International Search Report and Written Opinion dated Apr. 25, 2018, in PCT/US2018/015429, filed Jan. 26, 2018, 7 pages.

International Search Report and Written Opinion dated Dec. 21, 2018, in PCT/US2018/054887, filed Oct. 8, 2018, 8 pages.

International Preliminary Report on Patentability dated Feb. 4, 2021, in PCT/US2018/054887, filed Oct. 8, 2018, 7 pages.

International Search Report and Written Opinion dated Feb. 22, 2021, issued in corresponding International Patent Application No. PCT/US2020/062792, filed Dec. 2, 2020, 9 pages.

International Preliminary Report on Patentability dated Dec. 26, 2019, in PCT/US2018/015429, filed Jan. 26, 2018, 7 pages.

International Search Report and Written Opinion dated Feb. 3, 2022, issued in International Patent Application No. PCT/US2021/059362, filed Nov. 15, 2021, 9 pages.

First Office Action dated Jan. 6, 2022, with Search Report, issued in Chinese Application No. 201880095833.7, filed Oct. 8, 2018, 13 pages.

Toolbox Widget, "Angled Wrench Organizers | Modular Angled Large Wrench Organizers," <https://toolboxwidget.com/products/toolbox-large-wrench-organizers?variant=15690168729666> (retrieved Jan. 30, 2020), as early as Aug. 10, 2020, 2 pages.

Toolbox Widget, "Modular Toolbox Screwdriver Organizers | Toolbox Screwdriver Holder," <https://toolboxwidget.com/products/toolbox-screwdriver-organizers> (retrieved Jan. 30, 2020), as early as Aug. 10, 2020, 2 pages.

Toolbox Widget, "Modular Wrench Organizers for Toolbox | Vertical Wrench Organizers," <https://toolboxwidget.com/products/toolbox-wrench-organizer?variant=12674192867394> (retrieved Jan. 30, 2020), as early as Aug. 2020, 13 pages.

Second Review Opinion Notice dated Jul. 14, 2022, issued in Chinese Patent Application No. 201880095833.7, filed Oct. 8, 2021, 22 pages.

Denial Decision dated Jul. 1, 2023, issued in Chinese Patent Application No. 201880095833.7, filed Oct. 8, 2018, 22 pages.

Extended European Search Report dated Oct. 20, 2023, issued in corresponding EP Application No. 20903047.7, filed Dec. 2, 2020, 8 pages.

INTERCHANGEABLE AND INTERCONNECTABLE TOOL ORGANIZING DEVICE

CROSS-REFERENCES TO RELATED APPLICATIONS

This application is a continuation of U.S. patent application Ser. No. 17/446,003, filed Aug. 26, 2021 (now U.S. patent Ser. No. 11/590,644), which is a continuation of U.S. patent application Ser. No. 16/721,126, filed Dec. 19, 2019 (now U.S. patent Ser. No. 11/103,989), which is a continuation-in-part of U.S. application Ser. No. 15/622,169, filed Jun. 14, 2017, and a continuation-in-part of U.S. application Ser. No. 16/041,806 (now U.S. Pat. No. 11,110,589), filed Jul. 22, 2018, which is a continuation of U.S. application Ser. No. 15/622,169, filed Jun. 14, 2017, all of which applications are incorporated herein by reference in their entirety.

BACKGROUND

Field of the Invention

The present general inventive concept relates generally to a tool organizing device, and particularly, to an interchangeable and interconnectable tool organizing device.

Description of the Related Art

There are currently no practical and inexpensive products on the market that offer an accessory that can provide custom organization for tool storage. Most individuals keep their mechanical instruments stored within tool boxes or varied containers; however, these storage bins tend to hold many devices. Having so many instruments and tools within a tool box or a mechanic's drawer can make it difficult to find the proper tool needed for use, due to clutter and disorganization.

Therefore, there is a need for a device that facilitates easy storing and organizing of tools within a tool box and/or drawer.

There is also a need for an inexpensive device that facilitates easy storing and organizing of tools.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present general inventive concept provides an interchangeable and interconnectable tool organizing device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a custom tool accessory to hold a tool, the custom tool accessory including a body, at least one tongue disposed at a first side of the body, at least one tongue receiving groove disposed at a second side of the body opposite from the first side of the body, and a tool holding portion disposed on the body to hold the tool.

The custom tool accessory may further include a magnet disposed on a bottom surface of the body to magnetically connect the custom tool accessory to a metal surface.

The at least one tongue may be inserted into another at least one tongue receiving groove of another custom tool accessory to connect the custom tool accessory to the another custom tool accessory.

The at least one tongue may have a shape to correspond to and fit within the at least one tongue receiving groove.

The shape may be at least one of a trapezoidal shape, a triangular shape, a circular shape, and a rectangular shape.

The tool holding portion may include at least one socket receiving portion to protrude perpendicularly away from a top surface of the body to receive a tool having a shape of a socket.

The at least one socket receiving portion may include an aperture disposed at a top surface thereof to allow a labeling device identifying a size of the tool to be inserted therein.

The tool holding portion may include a concave portion disposed on a top surface of the body to receive a tool having a rounded shape.

The concave portion may include a missing tool indicator having a color different from the body to be visible when the tool is not disposed on the concave portion.

The tool holding portion may include a crevice, including a missing tool indicator disposed at a bottom most portion of the crevice, a first wall inclined surface disposed at an angle extending downwards from a top surface of the first wall toward the missing tool indicator, and a second wall inclined surface 414 disposed at an angle extending downwards from a top surface of the second wall toward the missing tool indicator.

The first wall and the second wall may be perpendicular with respect to a bottom surface of the body.

The first wall and the second wall may be disposed at an angle with respect to a bottom surface of the body.

The tool holding portion may include a first inner wall parallel to the first wall and the second wall, a second inner wall parallel to the first wall and the second wall, to face the first inner wall, and a tool receiving portion disposed between a bottom portion of the first inner wall and a bottom portion of the second inner wall.

The tool holding portion may include a first tool receiving portion disposed at an angle with respect to the first wall a first wall inclined surface disposed at an angle extending downwards from a top portion of the first wall toward the second tool receiving portion, a second tool receiving portion disposed at an angle with respect to the second wall, and a second wall inclined surface disposed at an angle extending downwards from a top portion of the second wall toward the first tool receiving portion.

In accordance with a further embodiment of the present disclosure, a modular tool holder for use separately and with one or more corresponding tool holders, the modular tool holder comprises:

- a body portion comprising a base portion and a tool holding portion disposed above the base portion;
- at least one tongue disposed at a first side of the body;
- at least one tongue receiving groove disposed on a second side of the body opposite from the first side of the body;
- a metallic base plate positioned in the base portion of the body; and at least one magnet affixed to the underside of the metallic base plate to magnetically connect the modular tool holder to a metallic surface.

In an embodiment described herein, the area of the metallic base plate is larger than the area of the at least one magnet.

In an embodiment described herein, wherein the magnet is of a planar configuration.

In an embodiment described herein, further comprising a retainer to surround the at least one magnet to assist in retaining the at least one magnet in stationary position.

In an embodiment described herein, wherein the retainer is in the shape of the base plate.

In an embodiment described herein, wherein the retainer comprising an opening for receiving the at least one magnet closely therein.

In an embodiment described herein, wherein the retainer is of a thickness corresponding to the thickness of the at least one magnet.

In an embodiment described herein, wherein perimeter portions of the retainer engage with receiving slots formed in the base portion of the body portion to secure the retainer to the body portion.

In an embodiment described herein, wherein portions of the retainer lock into engagement with corresponding portions of the body portion.

In an embodiment described herein, wherein the tool holding portion is selected from the group consisting of:

(1) a socket receiving portion projecting upwardly from the base portion to engage through the drive hole of a socket;

(2) a plurality of sockets extending downwardly into the body for receiving the shank portions of tool bits;

(3) spaced apart first and second walls extending upwardly from the base portion for receiving a tool to be held between the first and second walls;

(4) a plurality of walls extending upwardly from the base portion to receive a tool to be held between adjacent wall pairs.

In an embodiment described herein, wherein:

the first and second walls extend in one of the following relationships to each other:

in vertical spaced apart relationship to each other;

in slanted parallel relationship to each other;

diverging from each other in the upward direction;

initially diverging from each other in the upward direction from the base portion and then extending parallel to each other for the remainder of the elevation of the first and second walls.

In an embodiment described herein, wherein the tool holding portion comprising first and second walls extending upwardly from the base portion and wherein the distance separating the first and second walls is adjustable to accommodate tools of different sizes.

In an embodiment described herein, further comprising a linear ratchet projects from one of the first and second walls, the linear ratchet defining a series of transverse slots extending along the length of the linear ratchet; and a pawl carried by a transverse pawl lever operable to engage and disengage the pawl from the ratchet transverse slots.

In an embodiment described herein, wherein the pawl is mounted on a transverse pawl bar that is movable lengthwise of the pawl bar to engage and disengage the pawl from the ratchet slots.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
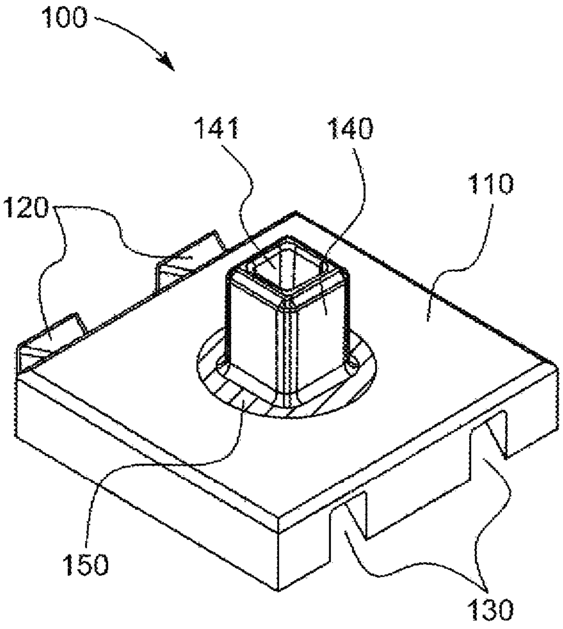
FIG. 1A illustrates a top angled perspective view of a custom tool accessory, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," left hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

In the following description, various embodiments of the present disclosure are described. In the following description and in the accompanying drawings, the corresponding systems assemblies, apparatus and units may be identified by the same part number, but with an alpha suffix or by a prime ("'") or double prime ("''") or even a triple prime ("'''") designation. The descriptions of the parts/components of such systems assemblies, apparatus, and units that are the same or similar are not repeated so as to avoid redundancy in the present application.

FIGS. 1A through 14 illustrate various embodiments of an interchangeable and interconnectable tool organizing device, but may be referred to hereinafter as a custom tool accessory.

FIG. 1A illustrates a top angled perspective view of a custom tool accessory 100, according to an exemplary embodiment of the present general inventive concept.

Figure 1B:
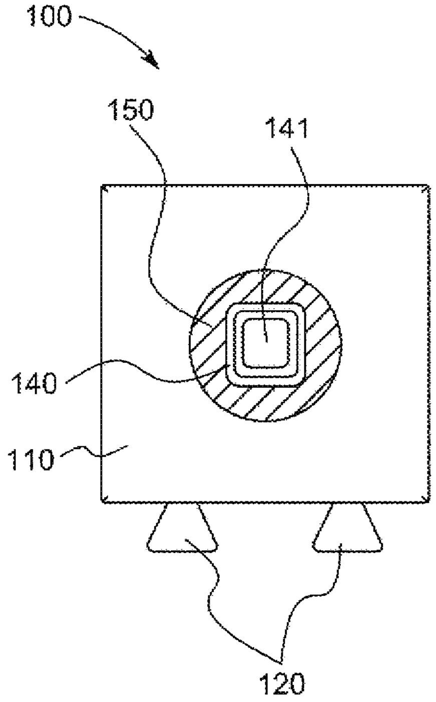
FIG. 1B illustrates a top view of the custom tool accessory, according to an exemplary embodiment of the present general inventive concept.

FIG. 1B illustrates a top view of the custom tool accessory 100, according to an exemplary embodiment of the present general inventive concept.

Figure 1C:
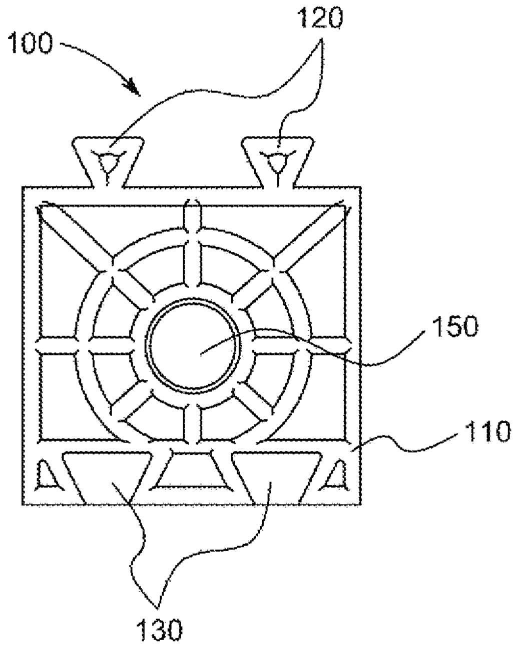
FIG. 1C illustrates a bottom view of the custom tool accessory, according to an exemplary embodiment of the present general inventive concept.

FIG. 1C illustrates a bottom view of the custom tool accessory 100, according to an exemplary embodiment of the present general inventive concept.

Figure 1D:
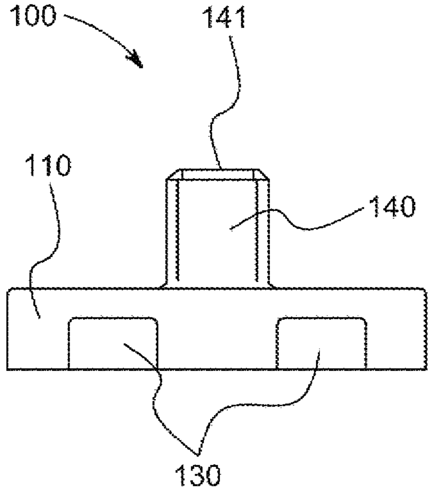
FIG. 1D illustrates a side view of the custom tool accessory, according to an exemplary embodiment of the present general inventive concept.

FIG. 1D illustrates a side view of the custom tool accessory 100, according to an exemplary embodiment of the present general inventive concept.

Referring to FIGS. 1A through 1D, the custom tool accessory 100 may be constructed from plastic, rubber, metal, wood, or any other material known to one of ordinary skill in the art.

The custom tool accessory 100 may include a body 110, at least one tongue 120, at least one tongue receiving groove 130, a socket receiving portion 140, and a magnet 150.

The at least one tongue 120 may be disposed at a side portion of the body 110 to extend laterally therefrom, and may have a trapezoidal shape, a triangular shape, a circular shape, a rectangular shape, or any other shape known to one of ordinary skill in the art.

The at least one tongue receiving groove 130 may be disposed at another side portion of the body 110 opposite from the at least one tongue 120, and may be cut into the another side portion of the body 110 to have a trapezoidal shape, a triangular shape, a circular shape, a rectangular shape, or any other shape known to one of ordinary skill in the art that corresponds to the at least one tongue 120. As such, two custom tool accessories 100 may be interlocked together by inserting the at least one tongue 120 of a first custom tool accessory 100 into the at least one tongue receiving groove 130 of a second custom tool accessory 100.

The socket receiving portion 140 may be disposed at on a top surface of the body 110 at the center portion of the body 110, such that the socket receiving portion 140 protrudes perpendicularly away from the top surface of the body 110. The socket receiving portion 140 may have a cubical shape, a rectangular shape, a hexagonal shape, or any other shape known to one of ordinary skill in the art to allow a socket, a socket wrench, or any other similar tool to be inserted thereupon such that the socket, socket wrench, or any other similar tool is held in place by the socket receiving portion 140. As such, the socket receiving portion 140 may also be known as a tool holding portion 140.

The socket receiving portion 140 may include an aperture 141 to allow a labeling device to be inserted therein, so that a user may easily see a size of the tool held by the socket receiving portion 140.

The magnet 150 may be disposed at a center portion of the body 110, but is not limited thereto. The magnet 150 may be provided within the center portion of the body 110 in order to allow the custom tool accessory 100 to magnetically connect to a metal surface.

Figure 2A:
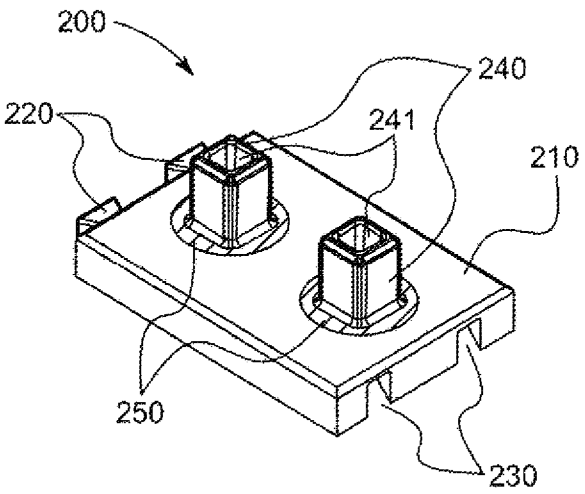
FIG. 2A illustrates a top angled view of a custom tool accessory, according to another exemplary embodiment of the present general inventive concept.

FIG. 2A illustrates a top perspective view of a custom tool accessory 200, according to another exemplary embodiment of the present general inventive concept.

Figure 2B:
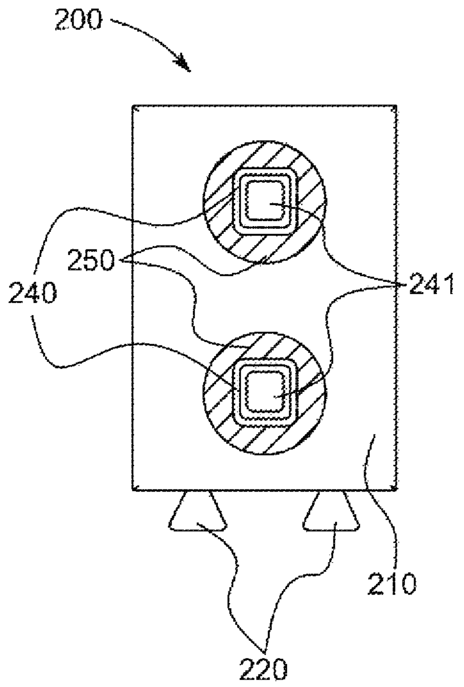
FIG. 2B illustrates a top view of the custom tool accessory, according to another exemplary embodiment of the present general inventive concept.

FIG. 2B illustrates a top view of the custom tool accessory 200, according to another exemplary embodiment of the present general inventive concept.

Figure 2C:
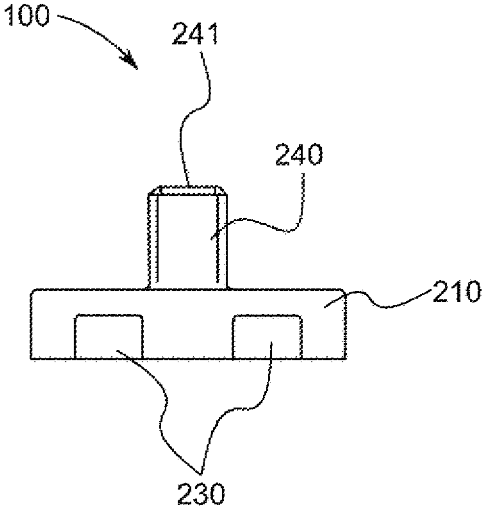
FIG. 2C illustrates a side view of the custom tool accessory, according to another exemplary embodiment of the present general inventive concept.
Figure 2D:
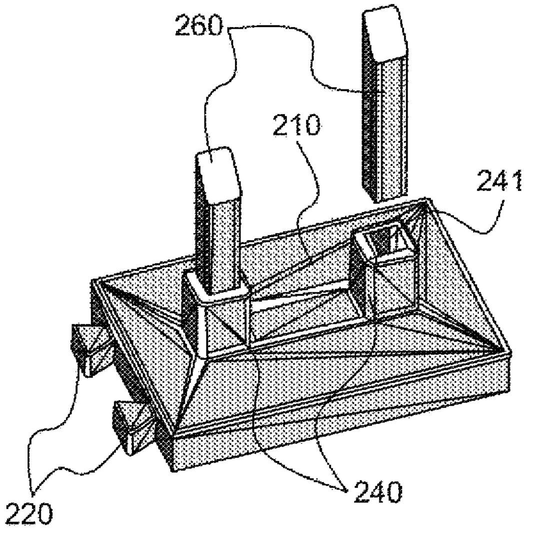
FIG. 2D illustrates another top perspective view of the custom tool accessory, according to another exemplary embodiment of the present general inventive concept.

FIG. 2C illustrates a side view of the custom tool accessory 200, according to another exemplary embodiment of the present general inventive concept FIG. 2D illustrates another top perspective view of the custom tool accessory 200, according to another exemplary embodiment of the present general inventive concept.

Referring to FIGS. 2A through 2D, the custom tool accessory 200 may be constructed from plastic, rubber, metal, wood, or any other material known to one of ordinary skill in the art.

Also, the custom tool accessory 200 may have similar components and functionalities as the custom tool accessory 100, but is designed to hold two tools simultaneously instead of one tool.

The custom tool accessory 200 may include a body 210, at least one tongue 220, at least one tongue receiving groove 230, a plurality of socket receiving portions 240, and at least one magnet 250.

The at least one tongue 220 may be disposed at a side portion of the body 210 to extend laterally therefrom, and may have a trapezoidal shape, a triangular shape, a circular shape, a rectangular shape, or any other shape known to one of ordinary skill in the art. The at least one tongue receiving groove 230 may be disposed at another side portion of the body 210 opposite from the at least one tongue 220, and may be cut into the another side portion of the body 210 to have a trapezoidal shape, a triangular shape, a circular shape, a rectangular shape, or any other shape known to one of ordinary skill in the art that corresponds to the at least one tongue 220. As such, two custom tool accessories 200 may be interlocked together by inserting the at least one tongue 220 of a first custom tool accessory 200 into the at least one tongue receiving groove 230 of a second custom tool accessory 200.

The plurality of socket receiving portions 240 may be provided as two or more sockets 240 on a top surface of the body 210, such that the plurality of socket receiving portions 240 protrude perpendicularly away from the top surface of the body 210. The plurality of socket receiving portions 240 may have a cubical shape, a rectangular shape, a hexagonal shape, or any other shape known to one of ordinary skill in the art to allow a socket, a socket wrench, or any other similar tool to be inserted thereupon such that the socket, socket wrench, or any other similar tool is held in place by the plurality of socket receiving portions 240. As such, the plurality of socket receiving portions 240 may also be known as tool holding portions 240.

The plurality of socket receiving portions 240 may each include an aperture 241 disposed at a top surface thereof to allow a labeling device 260 to be inserted therein. The labeling device 260 may be shaped like a rectangular prism such that it may fit into one of the apertures 241, and may have an angled top surface to allow users to view a labeled size of a tool disposed on the plurality of sockets, but is not limited thereto. The labeling device 260 may also be utilized in the aperture 141 of the socket receiving portion 140 of FIG. 1, or any other aperture in order to label a size of a tool that is disposed on a custom tool accessory.

The at least one magnet 250 may be disposed at a center portion of the body 210, but is not limited thereto. The at least one magnet 250 may be provided within the center portion of the body 210 in order to allow the custom tool accessory 200 to magnetically connect to a metal surface.

Figure 3A:
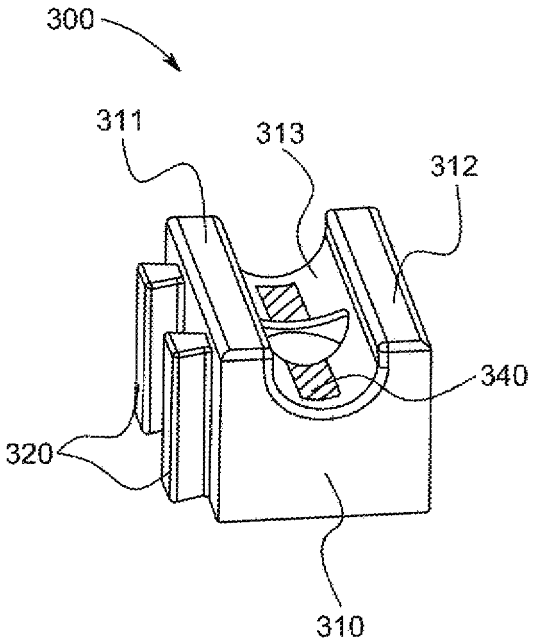
FIG. 3A illustrates a top perspective view of a custom tool accessory, according to another exemplary embodiment of the present general inventive concept.

FIG. 3A illustrates a top perspective view of a custom tool accessory 300, according to another exemplary embodiment of the present general inventive concept.

Figure 3B:
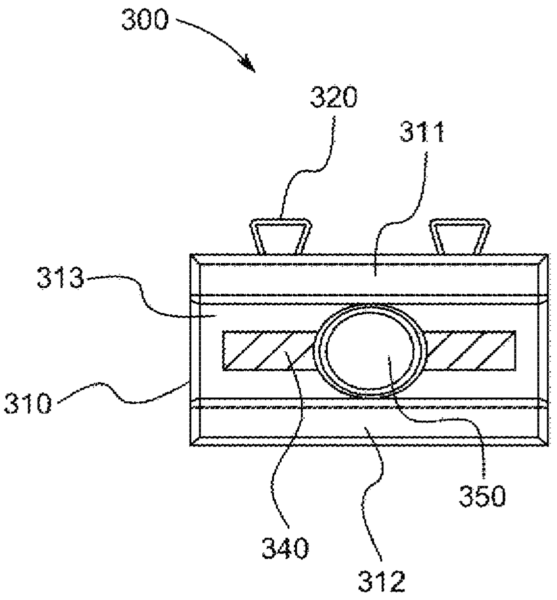
FIG. 3B illustrates a top view of the custom tool accessory, according to another exemplary embodiment of the present general inventive concept.

FIG. 3B illustrates a top view of the custom tool accessory 300, according to another exemplary embodiment of the present general inventive concept.

Figure 3C:
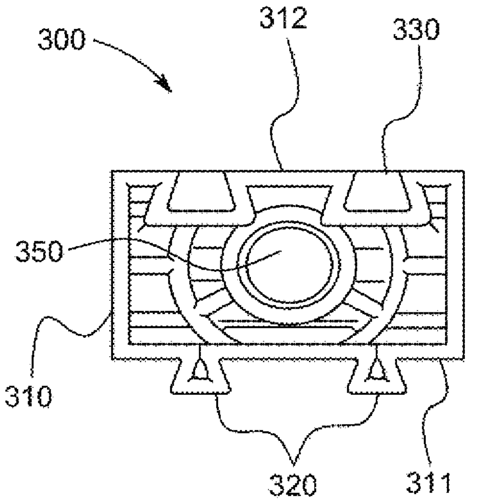
FIG. 3C illustrates a bottom view of the custom tool accessory, according to another exemplary embodiment of the present general inventive concept

FIG. 3C illustrates a bottom view of the custom tool accessory 300, according to another exemplary embodiment of the present general inventive concept.

Figure 3D:
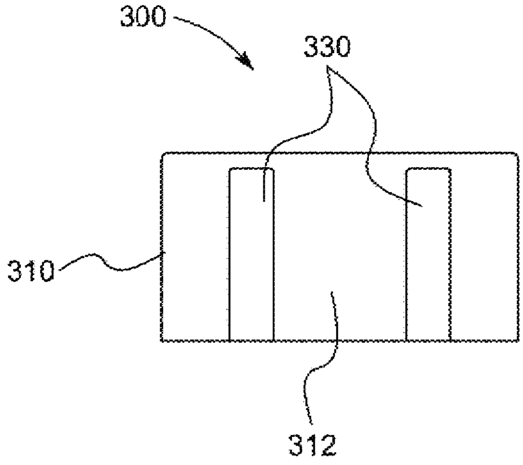
FIG. 3D illustrates a side elevational view of the custom tool accessory, according to another exemplary embodiment of the present general inventive concept.

FIG. 3D illustrates a side elevational view of the custom tool accessory 300, according to another exemplary embodiment of the present general inventive concept.

Referring to FIGS. 3A through 3D, the custom tool accessory 300 may be constructed from plastic, rubber, metal, wood, or any other material known to one of ordinary skill in the art.

The custom tool accessory 300 may include a body 310, at least one tongue 320, at least one tongue receiving groove 330, a missing tool indicator 340, and a magnet 350.

The body 310 may include a first wall 311, a second wall 312, and a concave surface 313 disposed between the first wall 311 and the second wall 312.

The at least one tongue 320 may be disposed at a side portion of the body 310, specifically at a side portion of the first wall 311, to extend laterally therefrom, and may have a trapezoidal shape, a triangular shape, a circular shape, a rectangular shape, or any other shape known to one of ordinary skill in the art.

The at least one tongue receiving groove 330 may be disposed at another side portion of the body 310 opposite from the at least one tongue 320, specifically at a side portion of the second wall 312, and may be cut into the another side portion of the body 310 of the second wall 312 to have a trapezoidal shape, a triangular shape, a circular shape, a rectangular shape, or any other shape known to one of ordinary skill in the art that corresponds to the at least one tongue 320. As such, two custom tool accessories 300 may be interlocked together by inserting the at least one tongue 320 of a first custom tool accessory 300 into the at least one tongue receiving groove 330 of a second custom tool accessory 300.

The missing tool indicator 340 may extend across a center portion of the concave surface 313 of the body 310, and may have a bright color (e.g., orange, yellow, etc.) to clearly indicate that a tool is missing from the custom tool accessory 300. When a tool is placed on the concave surface 313, and thus, over the missing tool indicator 340, the missing tool indicator 340 is no longer visible. The concave surface 313 may be designed to receive a tool having a rounded shape thereupon, such as a metal portion of a screwdriver, or any other similar tool. As such, the concave surface 313 may also be known as a tool holding portion 313.

The magnet 350 may be disposed at a center portion of the concave surface 313, but is not limited thereto. The magnet 350 may be provided within the center portion of the body 310 in order to allow the custom tool accessory 300 to magnetically connect to a metal surface. The magnet 350 may also be provided to maintain the tool, such as a screwdriver, magnetically connected to the concave surface 313.

Figure 4A:
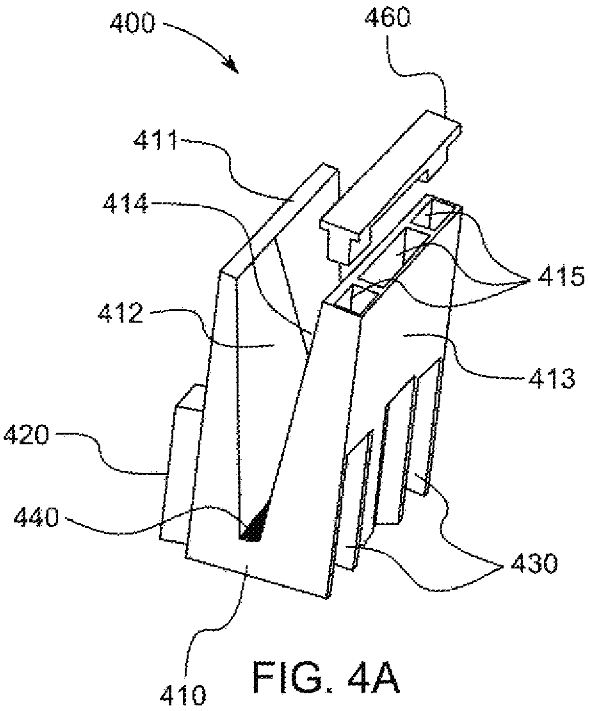
FIG. 4A illustrates a top perspective view of a custom tool accessory, according to another exemplary embodiment of the present general inventive concept.

FIG. 4A illustrates a top perspective view of a custom tool accessory 400, according to another exemplary embodiment of the present general inventive concept.

Figure 4B:
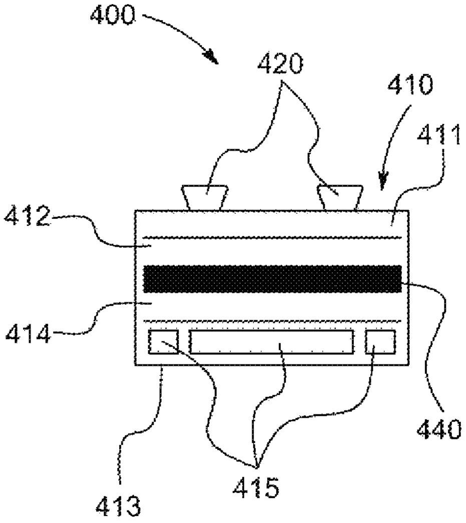
FIG. 4B illustrates a top view of the custom tool accessory, according to another exemplary embodiment of the present general inventive concept.

FIG. 4B illustrates a top view of the custom tool accessory 400, according to another exemplary embodiment of the present general inventive concept.

Figure 4C:
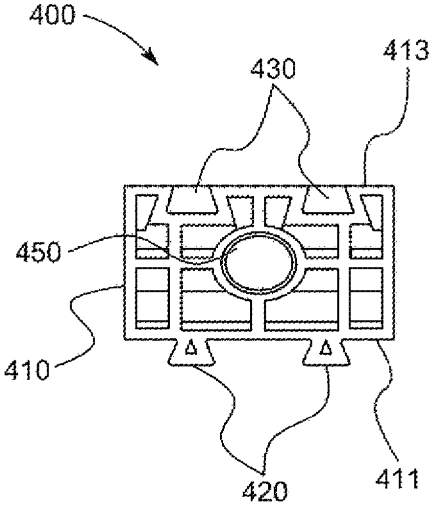
FIG. 4C illustrates a bottom view of the custom tool accessory, according to another exemplary embodiment of the present general inventive concept.

FIG. 4C illustrates a bottom view of the custom tool accessory 400, according to another exemplary embodiment of the present general inventive concept.

Figure 4D:
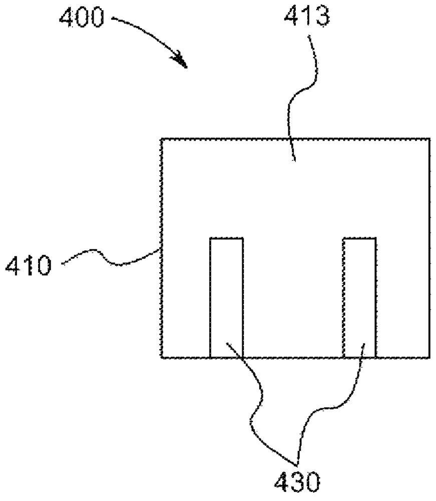
FIG. 4D illustrates a side view of the custom tool accessory, according to another exemplary embodiment of the present general inventive concept.

FIG. 4D illustrates a side view of the custom tool accessory 400, according to another exemplary embodiment of the present general inventive concept.

Referring to FIGS. 4A through 4D, the custom tool accessory 400 may be constructed from plastic, rubber, metal, wood, or any other material known to one of ordinary skill in the art.

The custom tool accessory 400 may include a body 410, at least one tongue 420, at least one tongue receiving groove 430, a missing tool indicator 440, a magnet 450, and a label 460.

The body 410 may include a first wall 411, a first wall inclined surface 412, a second wall 413, a second wall inclined surface 414, and a label receiving portion 415.

The first wall inclined surface 412 may be disposed at an angle extending downwards from a top surface of the first wall 411 toward the missing tool indicator 440.

The second wall inclined surface 414 may be disposed at an angle extending downwards from a top surface of the second wall 413 toward the missing tool indicator 440.

As such, the first wall inclined surface 412 and the second wall inclined surface 414 both converge at the missing tool indicator 440, and thus, extend diagonally upward from the missing tool indicator 440 toward top surfaces of the first wall 411 and the second wall 413, respectively.

The label receiving portion 415 may be disposed on the top surface connecting the second wall 413 and the second wall inclined surface 414, and may include at least one aperture to receive the label 460 therein. The label 460 may be an identifying member that may be inserted into the label receiving portion 415, such that it is interchangeable based on a user's preference. As such, the label 460 may allow the user to see whether a tool held by the custom tool accessory 400 has a particular size, such as 10 mm, 12 mm, etc.

The at least one tongue 420 may be disposed at a side portion of the body 410, specifically at a side portion of the first wall 411, to extend laterally therefrom, and may have a trapezoidal shape, a triangular shape, a circular shape, a rectangular shape, or any other shape known to one of ordinary skill in the art.

The at least one tongue receiving groove 430 may be disposed at another side portion of the body 410 opposite from the at least one tongue 420, specifically at a side portion of the second wall 413, and may be cut into the another side portion of the body 410 of the second wall 413 to have a trapezoidal shape, a triangular shape, a circular shape, a rectangular shape, or any other shape known to one of ordinary skill in the art that corresponds to the at least one tongue 420. As such, two custom tool accessories 400 may be interlocked together by inserting the at least one tongue 420 of a first custom tool accessory 400 into the at least one tongue receiving groove 430 of a second custom tool accessory 400.

The missing tool indicator 440 may form a surface disposed in a crevice at a substantially center portion of the body 410, specifically between a bottom portion of the first wall inclined surface 412 and the second wall inclined surface 414, and may have a bright color (e.g., orange, yellow, etc.) to clearly indicate that a tool is missing from the custom tool accessory 400. When a tool is placed on the missing tool indicator 440, and thus, over the missing tool indicator 440, the missing tool indicator 440 is no longer visible. The missing tool indicator 440 may be designed to receive a tool having a relatively flat shape and/or surface, such as a handle of a wrench, or any other similar tool. As such, the missing tool indicator 440 may also be known as a tool holding portion 440.

When the tool, such as a wrench, is disposed on the missing tool indicator 440, the tool may sit on an edge thereof at a 90-degree angle with respect to the missing tool indicator 440.

The magnet 450 may be disposed at a center portion of a bottom surface of the body 410, but is not limited thereto. The magnet 450 may be provided within the center portion of the body 410 in order to allow the custom tool accessory 400 to magnetically connect to a metal surface. The magnet 450 may also be provided to maintain the tool, such as a wrench, magnetically connected to the missing tool indicator 440.

Figure 5:
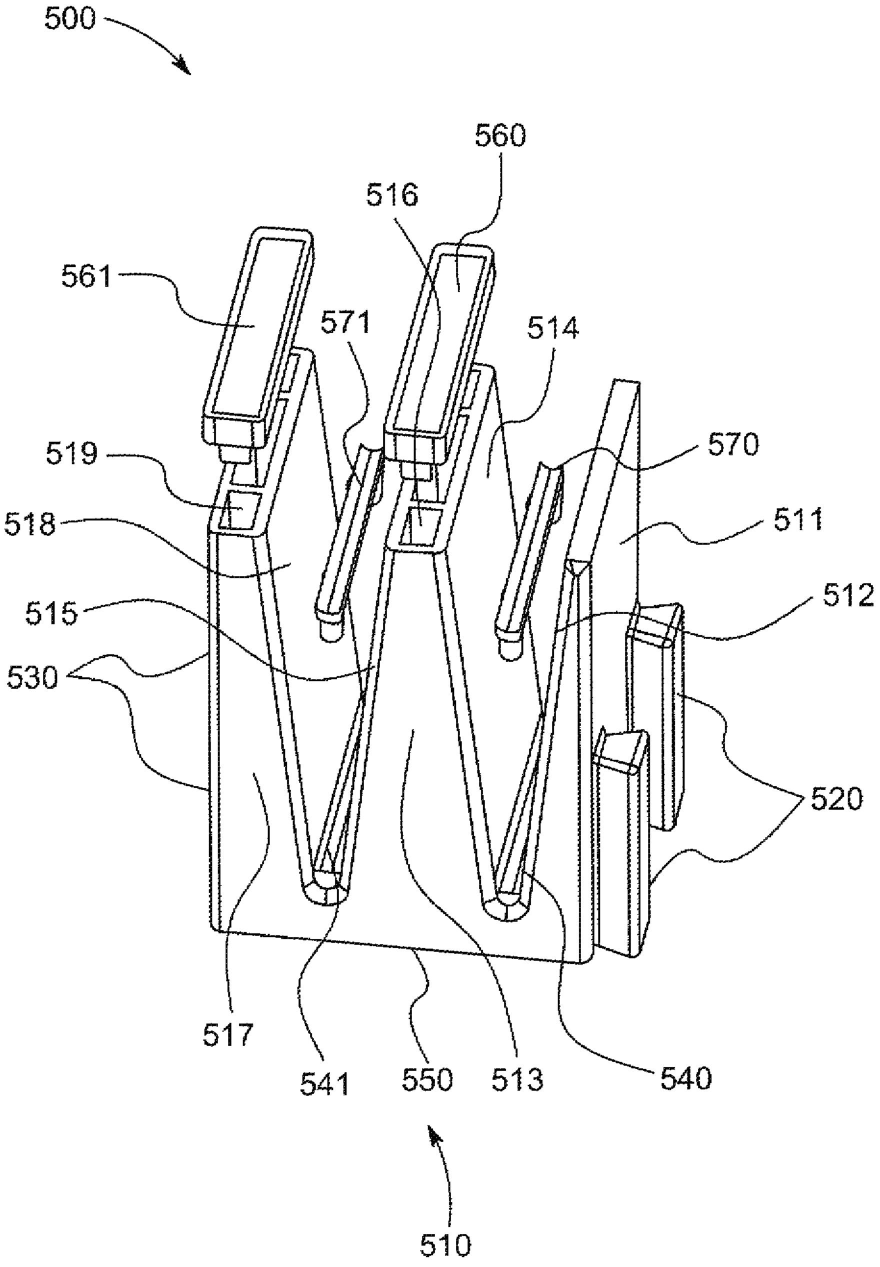
FIG. 5 illustrates a top perspective view of a custom tool accessory, according to another exemplary embodiment of the present general inventive concept.

FIG. 5 illustrates a top perspective view of a custom tool accessory 500, according to another exemplary embodiment of the present general inventive concept.

Referring to FIG. 5, the custom tool accessory 500 may be constructed from plastic, rubber, metal, wood, or any other material known to one of ordinary skill in the art.

Also, the custom tool accessory 500 may have similar components and functionalities as the custom tool accessory 400, but is designed to hold two tools simultaneously instead of one tool.

The custom tool accessory 500 may include a body 510, at least one tongue 520, at least one tongue receiving groove 530, a first missing tool indicator receiving portion 540, a second missing tool indicator receiving portion 541, a magnet 550, a first label 560, a second label 561, a first missing tool indicator 570, and a second missing tool indicator 571.

The body 510 may include a first outer wall 511, a first outer wall inclined surface 512, a center wall 513, a first center wall inclined surface 514, a second center wall inclined surface 515, a first label receiving portion 516, a second outer wall 517, a second outer wall inclined surface 518, and a second label receiving portion 519.

The first outer wall inclined surface 512 may be disposed at an angle extending downwards from a top surface of the first wall 511 toward the first missing tool indicator receiving portion 540.

The first center wall inclined surface 514 may be disposed at an angle extending downwards from a top surface of the center wall 513 (i.e., from the first label receiving portion 516) toward the first missing tool indicator receiving portion 540.

As such, the first outer wall inclined surface 512 and the first center wall inclined surface 514 both converge at the first missing tool indicator receiving portion 540, and thus, extend diagonally upward from the first missing tool indicator receiving portion 540 toward the top surfaces of the first wall 511 and the center wall 513 (i.e., the first label receiving portion 560), respectively.

The second center wall inclined surface 515 may be disposed at an angle extending downwards from the top surface of the center wall 513 toward the second missing tool indicator receiving portion 541.

The second outer wall inclined surface 518 may be disposed at an angle extending downwards from a top surface of the second outer wall 517 (i.e., from the second label receiving portion 519) toward the second missing tool indicator receiving portion 541.

As such, the second center wall inclined surface 515 and the second outer wall inclined surface 518 both converge at the second missing tool indicator receiving portion 541, and thus, extend diagonally upward from the second missing tool indicator receiving portion 541 toward the top surfaces of the center wall 513 and the second outer wall 517 (i.e., the second label receiving portion 561), respectively.

The first label receiving portion 516 may be disposed on the top surface of the center wall 513, specifically, disposed between the first center wall inclined surface 514 and the second center wall inclined surface 515. The first label receiving portion 516 may include at least one aperture to receive the first label 560 therein. The first label 560 may be an identifying member that may be inserted into the first label receiving portion 516, such that it is interchangeable based on a user's preference. As such, the first label 560 may allow the user to see whether a first tool held by the custom tool accessory 500 has a particular size, such as 10 mm, 12 mm, etc.

The second label receiving portion 519 may be disposed on the top surface of the second outer wall 517, specifically, disposed between the second outer wall inclined surface 518 and an outer surface of the second outer wall 517. The second label receiving portion 519 may include at least one aperture to receive the second label 561 therein. The second label 561 may be an identifying member that may be inserted into the second label receiving portion 519, such that it is interchangeable based on a user's preference. As such, the second label 561 may allow the user to see whether a second tool held by the custom tool accessory 500 has a particular size, such as 10 mm, 12 mm, etc.

The at least one tongue 520 may be disposed at a side portion of the body 510, specifically at a side portion of the first outer wall 511, to extend laterally therefrom, and may have a trapezoidal shape, a triangular shape, a circular shape, a rectangular shape, or any other shape known to one of ordinary skill in the art.

The at least one tongue receiving groove 530 may be disposed at another side portion of the body 510 opposite from the at least one tongue 520, specifically at a side portion of the second outer wall 517, and may be cut into the another side portion of the body 510 of the second outer wall 517 to have a trapezoidal shape, a triangular shape, a circular shape, a rectangular shape, or any other shape known to one of ordinary skill in the art that corresponds to the at least one tongue 520. As such, two custom tool accessories 500 may be interlocked together by inserting the at least one tongue 450 of a first custom tool accessory 500 into the at least one tongue receiving groove 530 of a second custom tool accessory 500.

The first missing tool indicator receiving portion 540 may be disposed in a crevice between a bottom portion of the first outer wall inclined surface 512 and the first center wall inclined surface 514, and may include at least one aperture to receive the first missing tool indicator 570 therein. The first missing tool indicator 570 may have a bright color (e.g., orange, yellow, etc.) to clearly indicate that a tool is missing from the custom tool accessory 500. When a tool is placed on the first missing tool indicator 570, and thus, over the first missing tool indicator 570, the first missing tool indicator 570 is no longer visible. The first missing tool indicator 570 may be designed to receive a tool having a relatively flat shape and/or surface, such as a handle of a wrench, or any other similar tool. As such, the first missing tool indicator 570 may also be known as a first tool holding portion 570.

When the tool, such as a wrench, is disposed on the first missing tool indicator 570, the tool may sit on an edge thereof at a 90-degree angle with respect to the first missing tool indicator 570.

The second missing tool indicator receiving portion 541 may be disposed in a crevice between a bottom portion of the second center wall inclined surface 515 and the second outer wall inclined surface 518, and may include at least one aperture to receive the second missing tool indicator 571 therein. The second missing tool indicator 571 may have a bright color (e.g., orange, yellow, etc.) to clearly indicate that a tool is missing from the custom tool accessory 500. When a tool is placed on the second missing tool indicator 571, and thus, over the second missing tool indicator 571, the second missing tool indicator 571 is no longer visible. The second missing tool indicator 571 may be designed to receive a tool having a relatively flat shape and/or surface, such as a handle of a wrench, or any other similar tool. As such, the second missing tool indicator 571 may also be known as a second tool holding portion 571.

When the tool, such as a wrench, is disposed on the second missing tool indicator 571, the tool may sit on an edge thereof at a 90-degree angle with respect to the first missing tool indicator 571.

The first missing tool indicator 570 and the second missing tool indicator 571 may be removably and interchangeably inserted into the first missing tool indicator receiving portion 540 and the second missing tool indicator receiving portion 541, respectively, in order to allow the user to have missing tool indicators of varying colors. This interchangeability and removability of the missing tool indicators may apply to all of the embodiments of the present general inventive concept.

The magnet 550 may be disposed at a center portion of a bottom surface of the body 510, but is not limited thereto, and may be provided in plurality along the bottom surface of the body 510. The magnet 550 may be provided at the bottom surface of the body 510 to correspond to the first missing tool indicator receiving portion 540 and the second missing tool indicator receiving portion 541, in order to allow the custom tool accessory 500 to magnetically connect to a metal surface, while also maintaining two tools, such as wrenches, magnetically connected to the first missing tool indicator receiving portion 540 and the second missing tool indicator receiving portion 541, respectively. Specifically, the magnetic connection may pass from the plurality of magnets 550 through the first missing tool indicator 570 and the second missing tool indicator 571, such that the two tools, such as wrenches, magnetically stick to and cover the first missing tool indicator 570 and the second missing tool indicator 571, respectively.

Figure 6A:
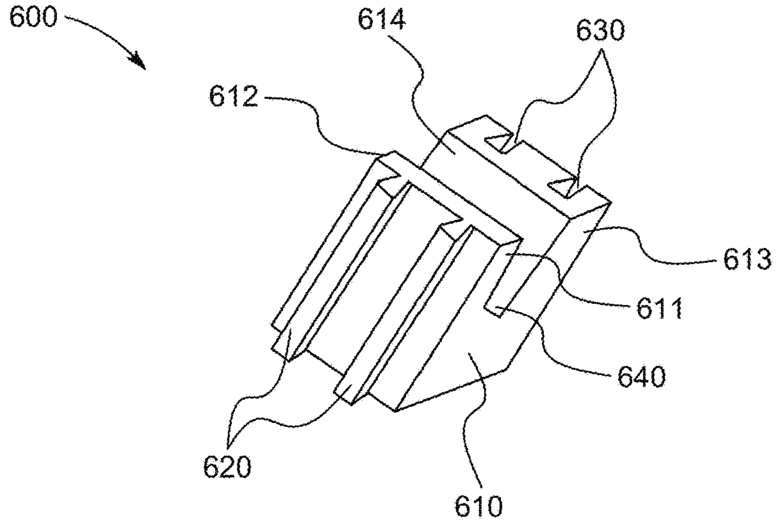
FIG. 6A illustrates a top perspective view of a custom tool accessory, according to another exemplary embodiment of the present general inventive concept.

FIG. 6A illustrates a top perspective view of a custom tool accessory 600, according to another exemplary embodiment of the present general inventive concept.

Figure 6B:
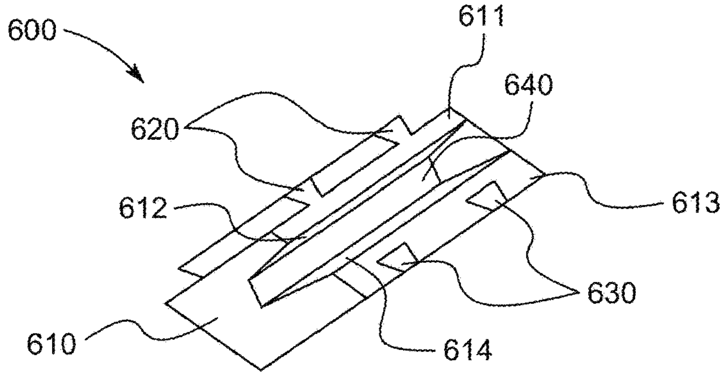
FIG. 6B illustrates another top perspective view of the custom tool accessory, according to another exemplary embodiment of the present general inventive concept.

FIG. 6B illustrates another top perspective view of the custom tool accessory 600, according to another exemplary embodiment of the present general inventive concept.

Figure 6C:
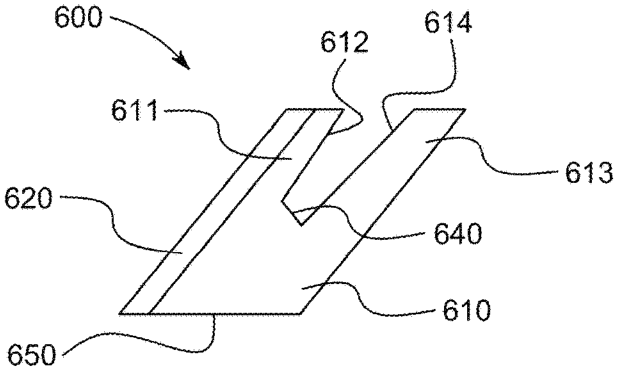
FIG. 6C illustrates a side elevational view of the custom tool accessory, according to another exemplary embodiment of the present general inventive concept.

FIG. 6C illustrates a side elevational view of the custom tool accessory 600, according to another exemplary embodiment of the present general inventive concept.

Referring to FIGS. 6A through 6C, the custom tool accessory 600 may be constructed from plastic, rubber, metal, wood, or any other material known to one of ordinary skill in the art.

The custom tool accessory 600 may include a body 610, at least one tongue 620, at least one tongue receiving groove 630, a missing tool indicator 640, and a magnet 650.

The body 610, and components thereof, may be similar to the body 410 of FIG. 4, but may be disposed at an angle in order to provide angled storage for a tool disposed within the custom tool accessory 600.

The body 610 may include a first wall 611, a first wall inclined surface 612, a second wall 613, a second wall inclined surface 614, and a label receiving portion 615.

The first wall inclined surface 612 may be disposed at an angle extending downwards from a top surface of the first wall 611 toward the missing tool indicator 640.

The second wall inclined surface 614 may be disposed at an angle extending downwards from a top surface of the second wall 613 toward the missing tool indicator 640.

As such, the first wall inclined surface 612 and the second wall inclined surface 614 both converge at the missing tool indicator 640, and thus, extend diagonally upward from the missing tool indicator 640 toward top surfaces of the first wall 611 and the second wall 613, respectively.

The at least one tongue 620 may be disposed at a side portion of the body 610, specifically at a side portion of the first wall 611, to extend laterally therefrom, and may have a trapezoidal shape, a triangular shape, a circular shape, a rectangular shape, or any other shape known to one of ordinary skill in the art.

The at least one tongue receiving groove 630 may be disposed at another side portion of the body 610 opposite from the at least one tongue 620, specifically at a side portion of the second wall 613, and may be cut into the another side portion of the body 610 of the second wall 613 to have a trapezoidal shape, a triangular shape, a circular shape, a rectangular shape, or any other shape known to one of ordinary skill in the art that corresponds to the at least one tongue 620. As such, two custom tool accessories 600 may be interlocked together by inserting the at least one tongue 620 of a first custom tool accessory 600 into the at least one tongue receiving groove 630 of a second custom tool accessory 600.

The missing tool indicator 640 may form a surface disposed in a crevice at a substantially center portion of the body 610, specifically between a bottom portion of the first wall inclined surface 612 and the second wall inclined surface 614, may also be disposed at an angle, and may have a bright color (e.g., orange, yellow, etc.) to clearly indicate that a tool is missing from the custom tool accessory 600. When a tool is placed on the missing tool indicator 640, and thus, over the missing tool indicator 640, the missing tool indicator 640 is no longer visible. The missing tool indicator 640 may be designed to receive a tool having a relatively flat shape and/or surface, such as a handle of a wrench, or any other similar tool. As such, the missing tool indicator 640 may also be known as a tool holding portion 640.

When the tool, such as a wrench, is disposed on the missing tool indicator 640, the tool may sit on an edge thereof at an angle (such as 60-degrees) with respect to the missing tool indicator 640.

The magnet 650 may be disposed at a center portion of a bottom surface of the body 610, but is not limited thereto. The magnet 650 may be provided within the center portion of the body 610 in order to allow the custom tool accessory 600 to magnetically connect to a metal surface. The magnet 650 may also be provided to maintain the tool, such as a wrench, magnetically connected to the missing tool indicator 640.

Figure 7A:
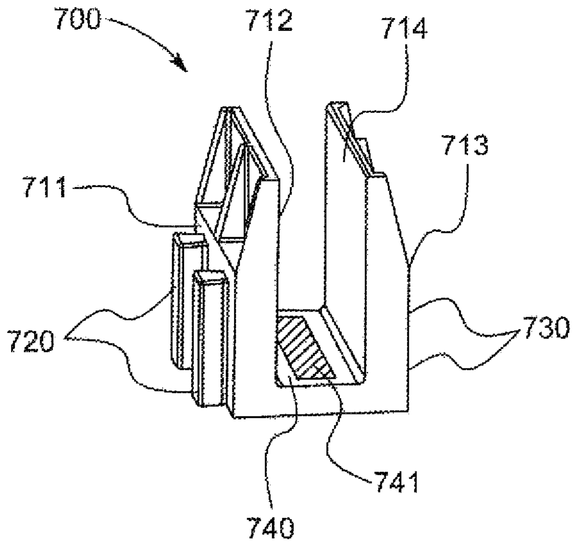
FIG. 7A illustrates a top perspective view of a custom tool accessory, according to another exemplary embodiment of the present general inventive concept.

FIG. 7A illustrates a top perspective view of a custom tool accessory 700, according to another exemplary embodiment of the present general inventive concept.

Figure 7B:
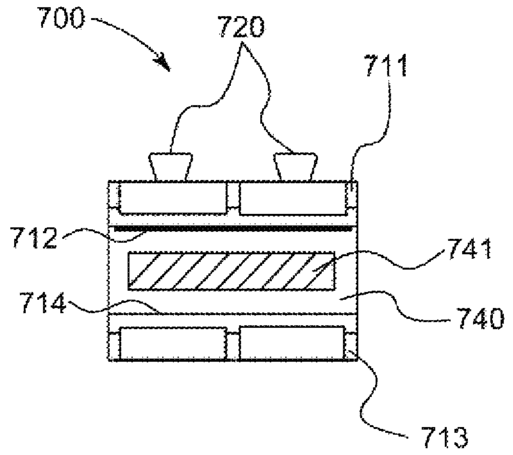
FIG. 7B illustrates a top view of the custom tool accessory, according to another exemplary embodiment of the present general inventive concept.

FIG. 7B illustrates a top view of the custom tool accessory 700, according to another exemplary embodiment of the present general inventive concept.

Figure 7C:
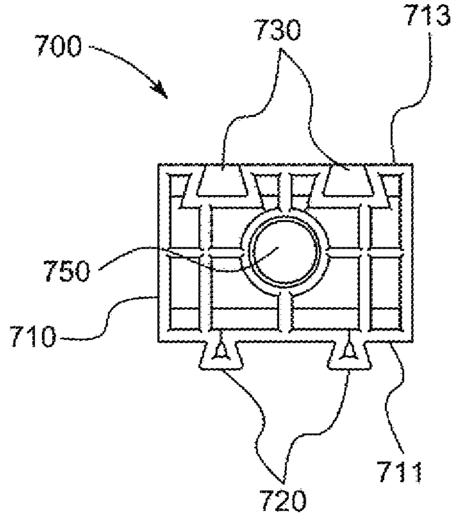
FIG. 7C illustrates a bottom view of the custom tool accessory, according to another exemplary embodiment of the present general inventive concept.

FIG. 7C illustrates a bottom view of the custom tool accessory 700, according to another exemplary embodiment of the present general inventive concept.

Figure 7D:
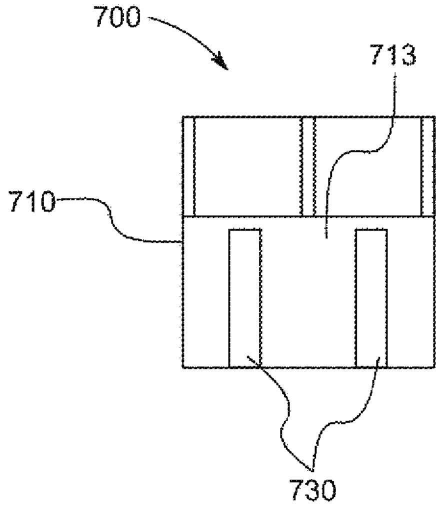
FIG. 7D illustrates a side view of the custom tool accessory, according to another exemplary embodiment of the present general inventive concept.

FIG. 7D illustrates a side view of the custom tool accessory 700, according to another exemplary embodiment of the present general inventive concept.

Referring to FIGS. 7A through 7D, the custom tool accessory 700 may be constructed from plastic, rubber, metal, wood, or any other material known to one of ordinary skill in the art.

The custom tool accessory 700 may include a body 710, at least one tongue 720, at least one tongue receiving groove 730, a tool receiving portion 740, and a magnet 750.

The body 710 may include a first outer wall 711, a first inner wall 712, a second outer wall 713, and a second inner wall 714.

The first inner wall 712 may be parallel to at least a portion of the first outer wall 711.

The second inner wall 714 may be parallel to at least a portion of the second outer wall 713.

The at least one tongue 720 may be disposed at a side portion of the body 710, specifically at a side portion of the first outer wall 711, to extend laterally therefrom, and may have a trapezoidal shape, a triangular shape, a circular shape, a rectangular shape, or any other shape known to one of ordinary skill in the art.

The at least one tongue receiving groove 730 may be disposed at another side portion of the body 710 opposite from the at least one tongue 720, specifically at a side portion of the second outer wall 713, and may be cut into the another side portion of the body 710 of the second outer wall 713 to have a trapezoidal shape, a triangular shape, a circular shape, a rectangular shape, or any other shape known to one of ordinary skill in the art that corresponds to the at least one tongue 720. As such, two custom tool accessories 700 may be interlocked together by inserting the at least one tongue 720 of a first custom tool accessory 700 into the at least one tongue receiving groove 730 of a second custom tool accessory 700.

The tool receiving portion 740 may be disposed between a bottom portion of the first inner wall 712 and a bottom portion of the second inner wall 714.

The missing tool indicator 741 may be disposed on a surface of the tool receiving portion 740 to cover at least a portion of the tool receiving portion 740, and may have a bright color (e.g., orange, yellow, etc.) to clearly indicate that a tool is missing from the tool receiving portion 740. When a tool is placed on the tool receiving portion 740, and thus, over the missing tool indicator 741, the missing tool indicator 741 is no longer visible.

The tool receiving portion 740 may be designed to receive a tool having any type of shape, such as tin snips, a ruler, a tape measure, pliers, a hammer, a drill, etc., but is not limited thereto. As such, the custom tool accessory 700 may also be known as a "Universal" custom tool accessory, as it allows many different types of tools to be held thereby.

The magnet 750 may be disposed at a center portion of a bottom surface of the body 710, but is not limited thereto. The magnet 750 may be provided within the center portion of the body 710 in order to allow the custom tool accessory 700 to magnetically connect to a metal surface. The magnet 750 may also be provided to maintain the tool, such as a wrench, magnetically connected to the tool receiving portion 740.

Figure 8A:
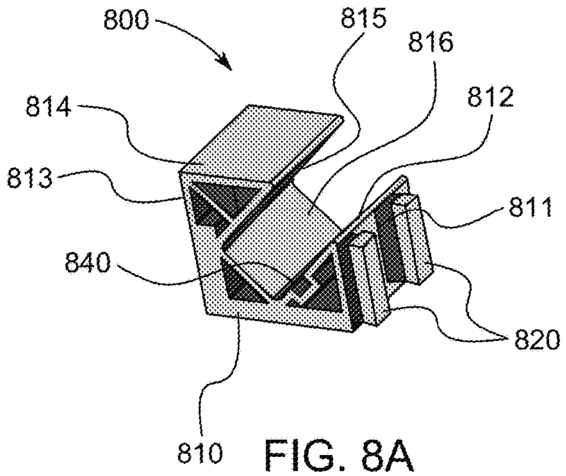
FIG. 8A illustrates a top perspective view of a custom tool accessory, according to another exemplary embodiment of the present general inventive concept.

FIG. 8A illustrates a top perspective view of a custom tool accessory 800, according to another exemplary embodiment of the present general inventive concept.

Figure 8B:
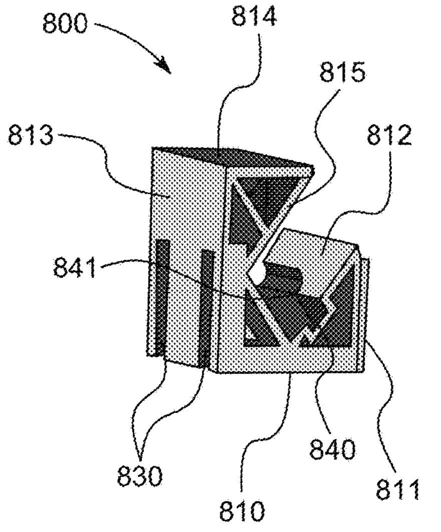
FIG. 8B illustrates another top perspective view of the custom tool accessory, according to another exemplary embodiment of the present general inventive concept.

FIG. 8B illustrates another top perspective view of the custom tool accessory 800, according to another exemplary embodiment of the present general inventive concept.

Figure 8C:
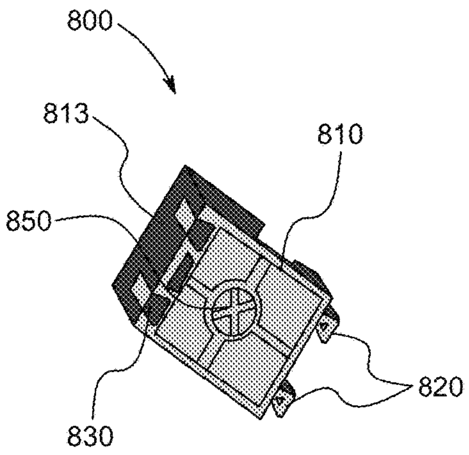
FIG. 8C illustrates a bottom perspective view of the custom tool accessory, according to another exemplary embodiment of the present general inventive concept.

FIG. 8C illustrates a bottom view of the custom tool accessory 800, according to another exemplary embodiment of the present general inventive concept.

Figure 8D:
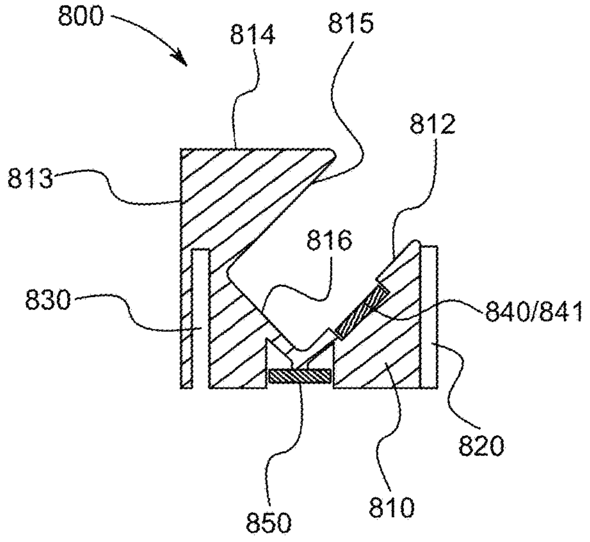
FIG. 8D illustrates a side elevational view of the custom tool accessory, according to another exemplary embodiment of the present general inventive concept.

FIG. 8D illustrates a side elevational view of the custom tool accessory 800, according to another exemplary embodiment of the present general inventive concept.

Referring to FIGS. 8A through 8D, the custom tool accessory 800 may be constructed from plastic, rubber, metal, wood, or any other material known to one of ordinary skill in the art.

The custom tool accessory 800 may include a body 810, at least one tongue 820, at least one tongue receiving groove 830, a first tool receiving portion 840, and a magnet 850.

The body 810 may include a first wall 811, a first wall inclined surface 812, a second wall 813, a second wall top surface 814, a second wall inclined surface 815, and a second tool receiving portion 816.

The first wall inclined surface 812 may be disposed at an angle extending downwards from a top portion of the first wall 811 toward the second tool receiving portion 816.

The second wall inclined surface 815 may be disposed at an angle extending downwards from an inner end of the top surface 814 toward the second tool receiving portion 816.

The second tool receiving portion 816 may be substantially flat, may be disposed between the first wall inclined surface 812 and the second wall inclined surface 815 and may be designed to receive a tool thereupon, along with the first tool receiving portion 840.

The first wall inclined surface 812 may be substantially parallel to the second wall inclined surface 815, and the second tool receiving portion 816 may be substantially perpendicularly to the first wall inclined surface 812 and the second wall inclined surface 815.

The at least one tongue 820 may be disposed at a side portion of the body 810, specifically at a side portion of the first wall 811, to extend laterally therefrom, and may have a trapezoidal shape, a triangular shape, a circular shape, a rectangular shape, or any other shape known to one of ordinary skill in the art.

The at least one tongue receiving groove 830 may be disposed at another side portion of the body 810 opposite from the at least one tongue 820, specifically at a side portion of the second wall 813, and may be cut into the another side portion of the body 810 of the second wall 813 to have a trapezoidal shape, a triangular shape, a circular shape, a rectangular shape, or any other shape known to one of ordinary skill in the art that corresponds to the at least one tongue 820. As such, two custom tool accessories 800 may be interlocked together by inserting the at least one tongue 820 of a first custom tool accessory 800 into the at least one tongue receiving groove 830 of a second custom tool accessory 800.

The first tool receiving portion 840 may include a missing tool indicator 841 thereupon, may also be disposed at an angle, and may have a bright color (e.g., orange, yellow, etc.) to clearly indicate that a tool is missing from the custom tool accessory 800. When a tool is placed on the first tool receiving portion 840, and thus, over the missing tool indicator 841, the missing tool indicator 841 is no longer visible. The first tool receiving portion 840 and the second tool receiving portion 816 may be designed to receive a tool such as a wrench, or any other similar tool. As such, the first tool receiving portion 840 and the second tool receiving portion 816 may also be known as a tool holding portion.

When the tool, such as a pair of pliers, is disposed on the first tool receiving portion 840 and the second tool receiving portion 816, the tool may sit (such as 45-degrees) with respect to the bottom surface of the body 810.

The magnet 850 may be disposed at a center portion of a bottom surface of the body 810, but is not limited thereto. The magnet 850 may be provided within the center portion of the body 810 in order to allow the custom tool accessory 800 to magnetically connect to a metal surface. The magnet 850 may also be provided to maintain the tool, such as a wrench, magnetically connected to the missing tool indicator 840.

Figure 9A:
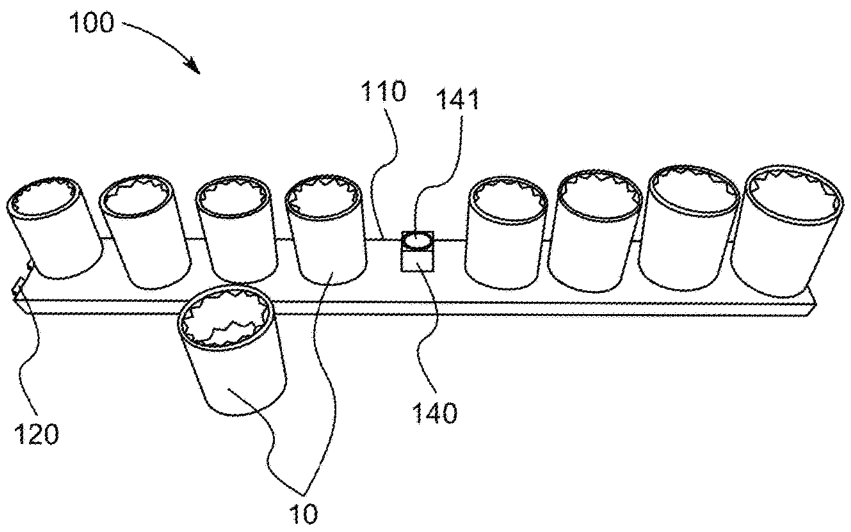
FIG. 9A illustrates a plurality of custom tool accessories linked together, according to an exemplary embodiment of the present general inventive concept.

FIG. 9A illustrates a plurality of custom tool accessories 100 linked together, according to an exemplary embodiment of the present general inventive concept.

As illustrated in FIGS. 1A, 1B, 1C, 1D, and FIG. 9A, a plurality of sockets 10 having various sizes may be disposed on sockets 140 of the plurality of custom tool accessories 100 to be stored thereupon.

Figure 9B:
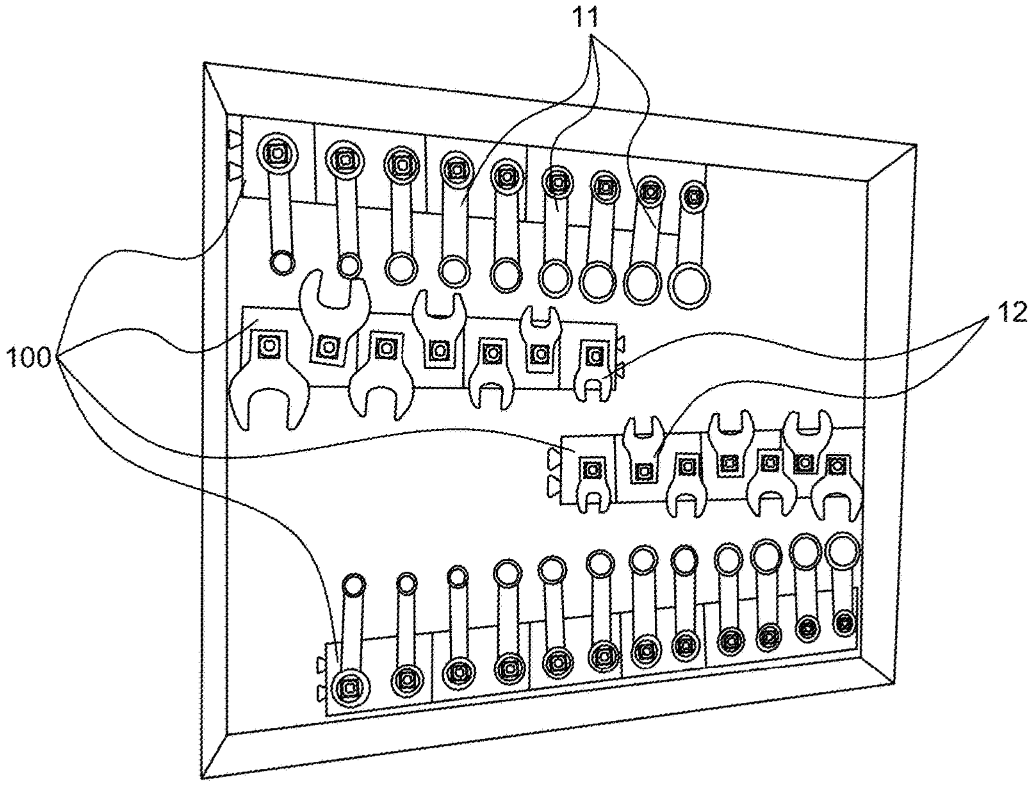
FIG. 9B illustrates various pluralities of custom tool accessories linked together within a mechanic's drawer, according to an exemplary embodiment of the present general inventive concept.

FIG. 9B illustrates various pluralities of custom tool accessories 100 linked together within a mechanic's drawer, according to an exemplary embodiment of the present general inventive concept.

As illustrated in FIGS. 1A, 1B, 1C, 1D, and 9B, a plurality of box end wrenches 11 and wrench heads 12 having various sizes may be disposed on sockets 140 of the plurality of custom tool accessories 100 to be stored thereupon.

Figure 10A:
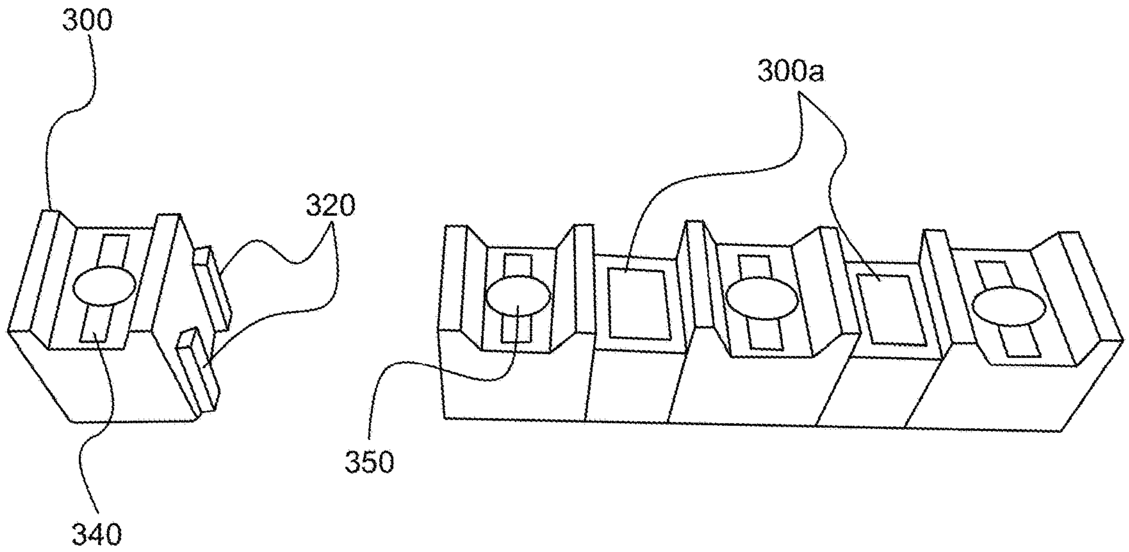
FIG. 10A illustrates a plurality of custom tool accessories linked together, according to an exemplary embodiment of the present general inventive concept.

FIG. 10A illustrates a plurality of custom tool accessories 300 linked together, according to an exemplary embodiment of the present general inventive concept.

As illustrated in FIGS. 3A, 3B, 3C, 3D, and FIG. 10A, the custom tool accessories 300 each have spacers 300*a* disposed therebetween in order to allow for extra space to be provided between each of the custom tool accessories 300. Each of the spacers 300*a* may include at least one tongue 320, at least one tongue receiving groove 330, similarly as the custom tool accessories 300.

Figure 10B:
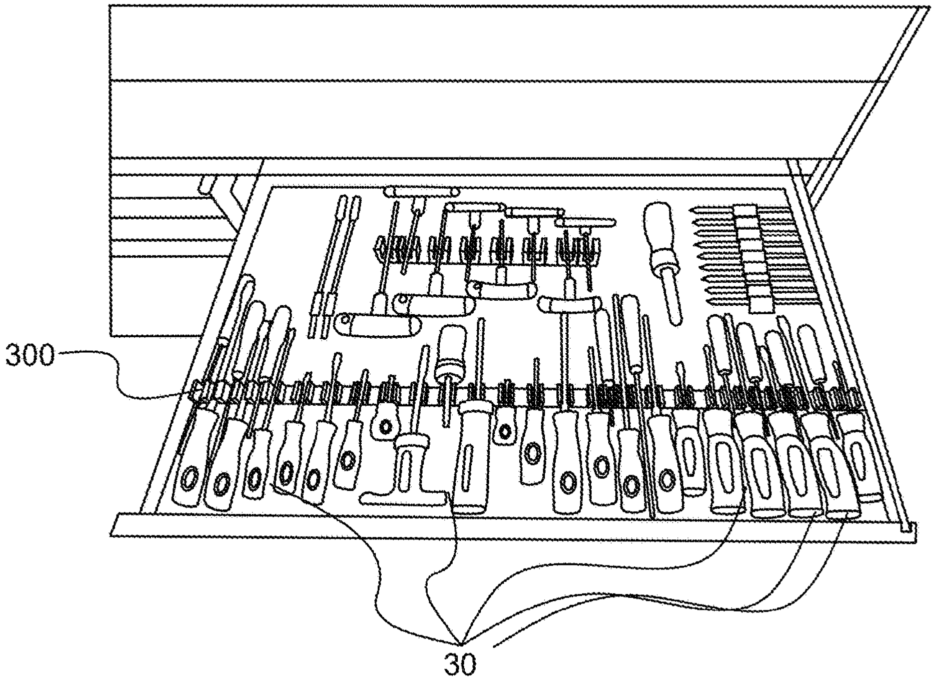
FIG. 10B illustrates various pluralities of custom tool accessories linked together within a mechanic's drawer, according to an exemplary embodiment of the present general inventive concept.

FIG. 10B illustrates various pluralities of custom tool accessories 300 linked together within a mechanic's drawer, according to an exemplary embodiment of the present general inventive concept.

As illustrated in FIGS. 3A, 3B, 3C, 3D, and 10B, a plurality of screwdrivers of sizes may be disposed on the custom tool accessories 300 to be stored thereupon.

Figure 11:
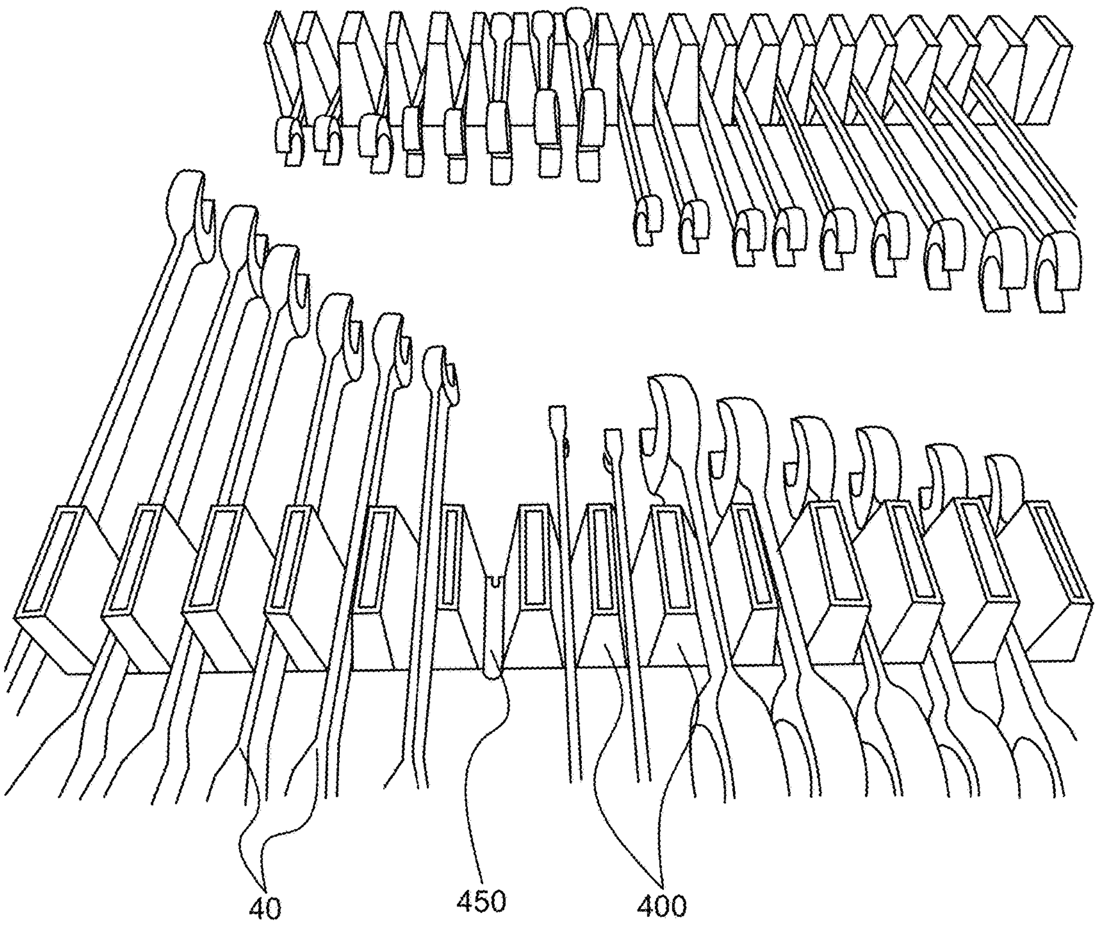
FIG. 11 illustrates a plurality of custom tool accessories linked together, according to an exemplary embodiment of the present general inventive concept.

FIG. 11 illustrates a plurality of custom tool accessories 400 linked together, according to an exemplary embodiment of the present general inventive concept.

As illustrated in FIGS. 4A, 4B, 4C, 4D, and 11, the custom tool accessories 400 have wrenches 40 disposed thereon, and it is clear that one of the custom tool accessories 400 without a wrench includes a visible missing tool indicator 450.

Figure 12A:
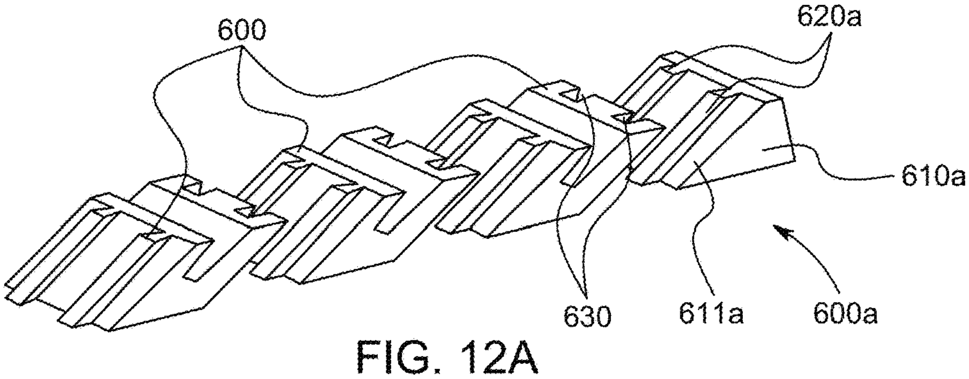
FIG. 12A illustrates a top perspective view of a plurality of custom tool accessories about to be linked together, according to an exemplary embodiment of the present general inventive concept.

FIG. 12A illustrates a top perspective view of a plurality of custom tool accessories 600 about to be linked together, according to an exemplary embodiment of the present general inventive concept.

Figure 12B:
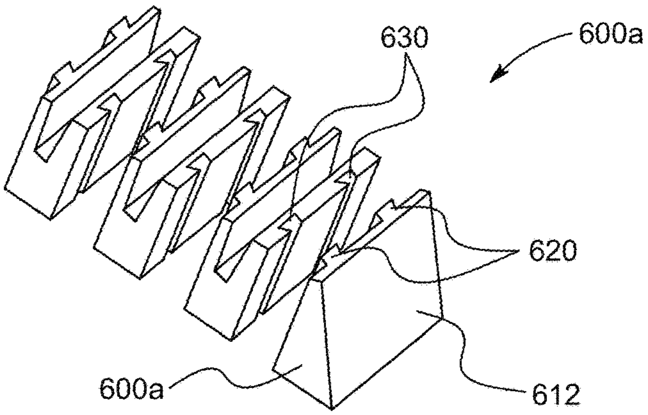
FIG. 12B illustrates another top perspective view of the plurality of custom tool accessories about to be linked together, according to an exemplary embodiment of the present general inventive concept.

FIG. 12B illustrates another top perspective view of the plurality of custom tool accessories 600 about to be linked together, according to an exemplary embodiment of the present general inventive concept.

Figure 12C:
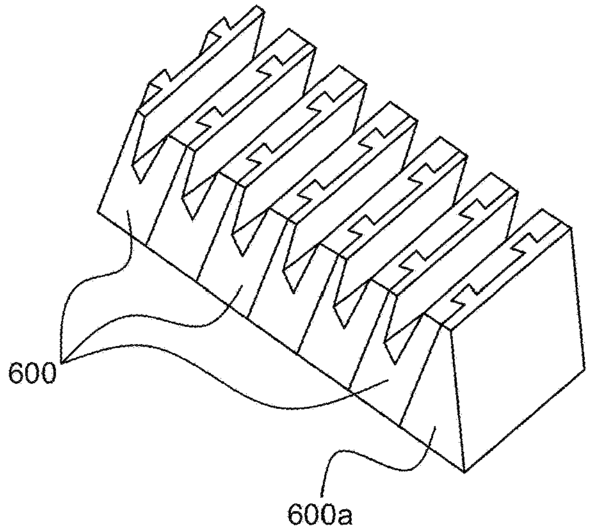
FIG. 12C illustrates the plurality of custom tool accessories 600 linked together, according to an exemplary embodiment of the present general inventive concept.

FIG. 12C illustrates the plurality of custom tool accessories 600 linked together, according to an exemplary embodiment of the present general inventive concept.

Referring to FIGS. 6A, 6B, 6C, 12A, 12B, and 12C, a stabilizer 600*a* may be provided at an end of the plurality of custom tool accessories 600 in order to add stability to the linked plurality of custom tool accessories 600.

Specifically, the stabilizer 600*a* may include a body 610*a*, a first inclined wall 611*a*, a second inclined wall 612*a*, and at least one tongue 620*a*.

The at least one tongue 620*a* may be disposed at a side portion of the body 610*a*, specifically at a side portion of the first wall 611*a*, to extend laterally therefrom, and may have a trapezoidal shape, a triangular shape, a circular shape, a rectangular shape, or any other shape known to one of ordinary skill in the art.

The at least one tongue 620*a* may be inserted into the at least one tongue receiving groove 630, in order to link the stabilizer 600*a* at an end of the plurality of custom tool accessories 600 linked together.

Figure 13A:
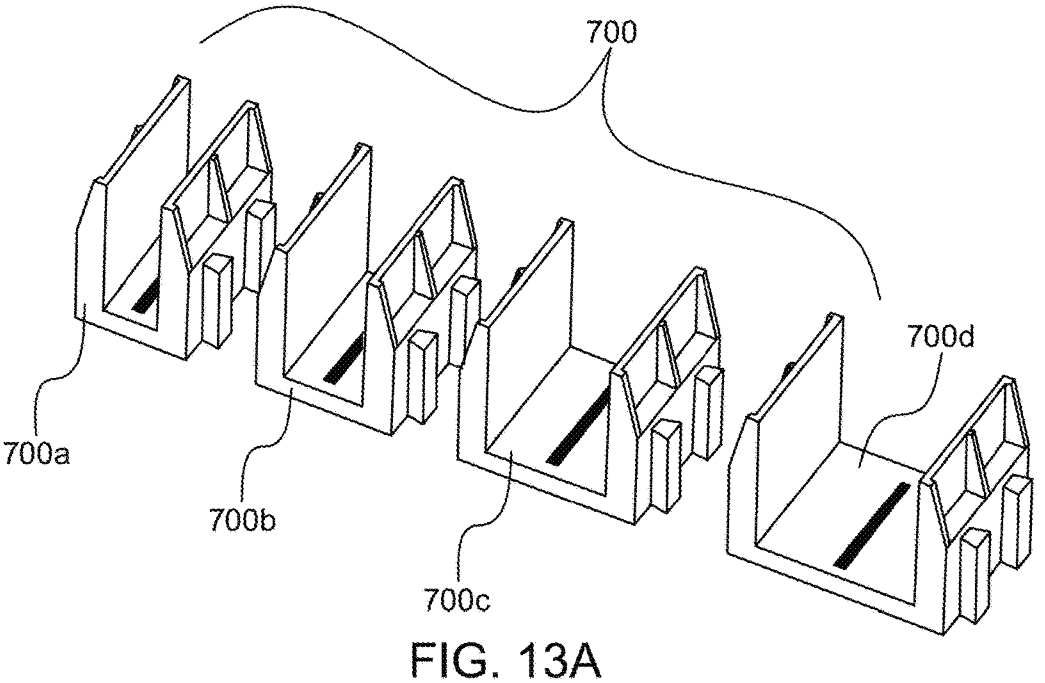
FIG. 13A illustrates a top perspective view of a plurality of custom tool accessories having various sizes, according to an exemplary embodiment of the present general inventive concept.

FIG. 13A illustrates a top perspective view of a plurality of custom tool accessories 700 having various sizes, according to an exemplary embodiment of the present general inventive concept.

Figure 13B:
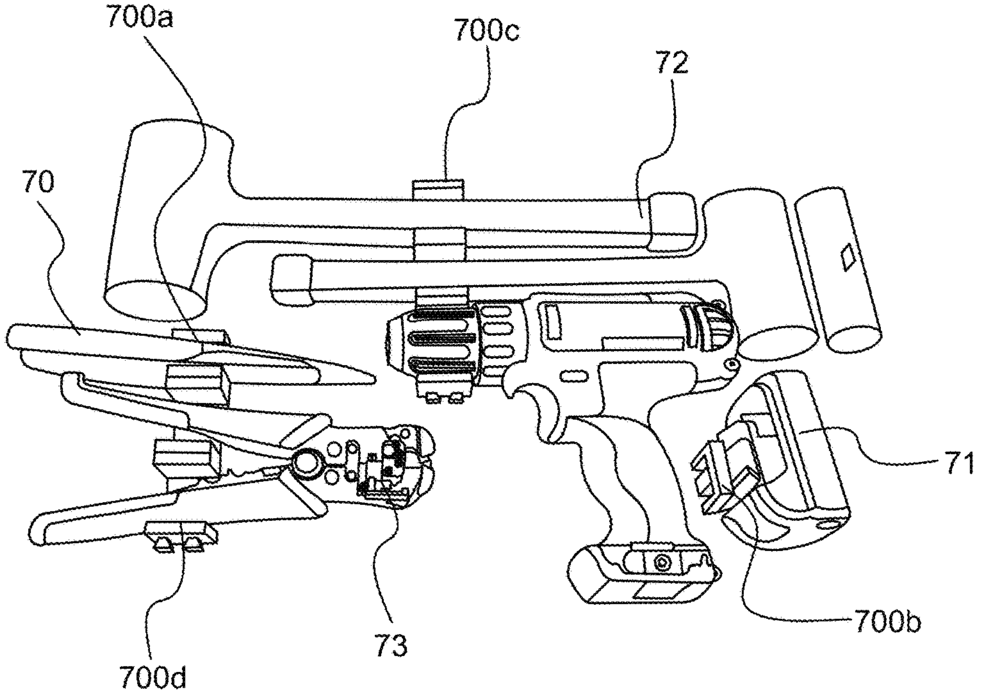
FIG. 13B illustrates various pluralities of custom tool accessories linked together within a mechanic's drawer, according to an exemplary embodiment of the present general inventive concept.

FIG. 13B illustrates various pluralities of custom tool accessories 700 linked together within a mechanic's drawer, according to an exemplary embodiment of the present general inventive concept.

Referring to FIGS. 7A, 7B, 7C, 7D, and 13A, it is clear that the custom tool accessory 700 may be included in various widths/sizes, in order to accommodate different types of tools therein.

As such, referring to FIGS. 7A, 7B, 7C, 7D, 13A, and 13B, a first custom tool accessory 700*a* may be used to hold tweezers 70 therein, a second custom tool accessory 700*b* may be used to hold a laser 71 therein, a third custom tool accessory 700*c* may be used to hold a mallet 72 therein, and a fourth custom tool accessory 700*d* may be used to hold a wire stripper therein. However, the custom tool accessories 700*a* through 700*d* are not limited to holding the aforementioned tools, and may hold any type of tools therein.

Figure 14:
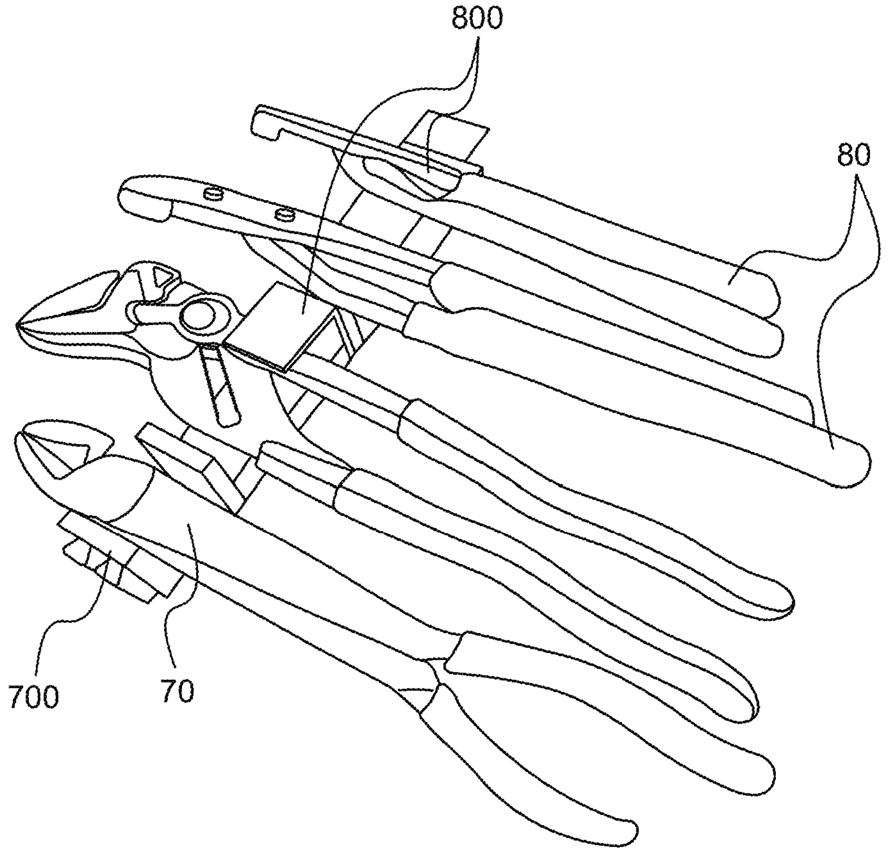
FIG. 14 illustrates various pluralities of custom tool accessories linked together within a mechanic's drawer, according to an exemplary embodiment of the present general inventive concept.

FIG. 14 illustrates various pluralities of custom tool accessories 800 linked together within a mechanic's drawer, according to an exemplary embodiment of the present general inventive concept.

Referring to FIGS. 8A, 8B, 8C, 8D, and 14, it is clear that the custom tool accessory 800 may be linked together with other custom tool accessories 700 or 800, in order to accommodate different types of tools therein, such as plier 80 and/or snips 70.

As such, the user may mix, match, and link different types of custom tool accessories together, including, but not limited to custom tool accessories 100, 200, 300, 400, 500, 600, 700, and 800.

The custom tool accessories of the embodiments as illustrated in FIGS. 1A through 14 may all include interchangeable and interconnectable tool organizing devices to facilitate organization of a user's tools within a tool box or a tool drawer. As such, professionals such as mechanics may utilize the custom tool accessories of the embodiments as illustrated in FIGS. 1A through 14 to hold, store, and organize all of their tools in the manner in which they desire, for easier visibility and accessibility.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

FIGS. 15A-31E illustrate further exemplary embodiments of the present disclosure. Some of these embodiments are similar in construction to the embodiments illustrated above in FIGS. 1A-14. In such instances, the part numbers for the embodiments in FIGS. 15A-31D are the same as in FIGS. 1A-14, but with the exception of a prime or double prime designation, or triple prime designation. As such, the description of these parts will not be repeated so as to avoid duplication.

One feature in the embodiments of FIGS. 15A-31D is the use of a metal base plate mounted to the base of the tool holder to which one or more magnets are attached. The use of the metal plate at the base of the tool holder provides a secure attachment structure for the magnet and thereby increases the structural integrity of the tool holder.

Another advantage of the embodiments of the present disclosure shown in FIGS. 15A-31D is that a "sandwich" magnet assembly is created. In this regard, the magnet is sandwiched between the metal base plate and the metallic surface on which the various embodiments of the tool holder are placed. As such, the metallic base plate and the metallic surface on which the tool holder is placed "sandwich" the magnet therebetween to create a more powerful magnetic assembly than if the metallic base plate were not in use. Such metallic assembly creates a magnetic field that can be many times stronger than the use of the magnet itself without the metallic base plate.

The enhanced effect of the magnetic assembly sandwich exists regardless of the composition of the magnet, whether the magnet is composed of metallic material, a ceramic material, etc.

Figure 15B:
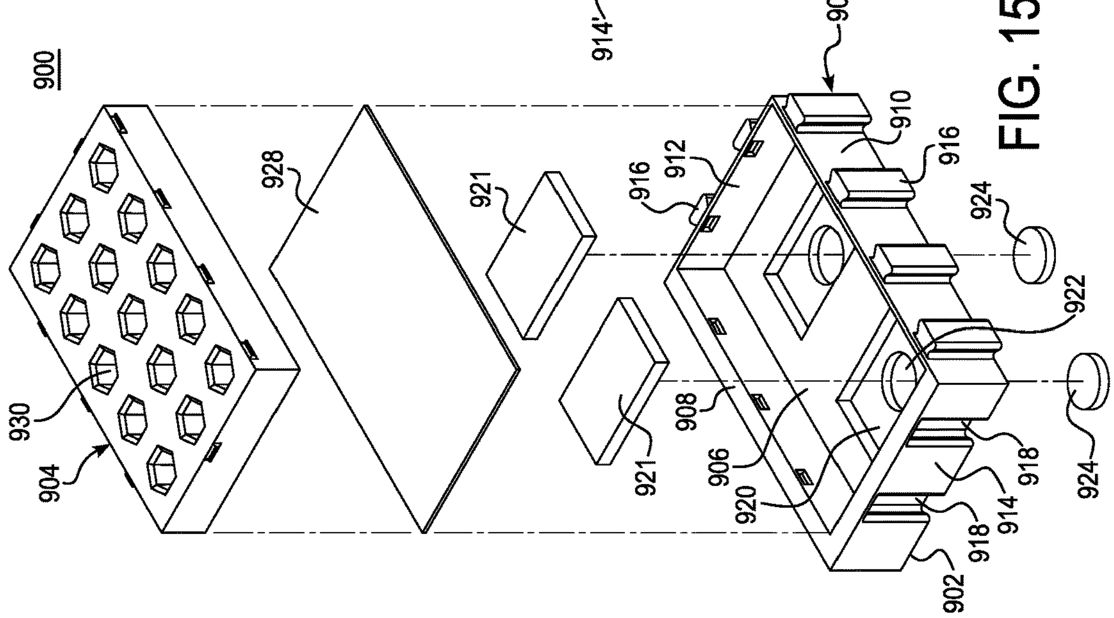
FIG. 15B is an exploded view of FIG. 15A.
Figure 15A:
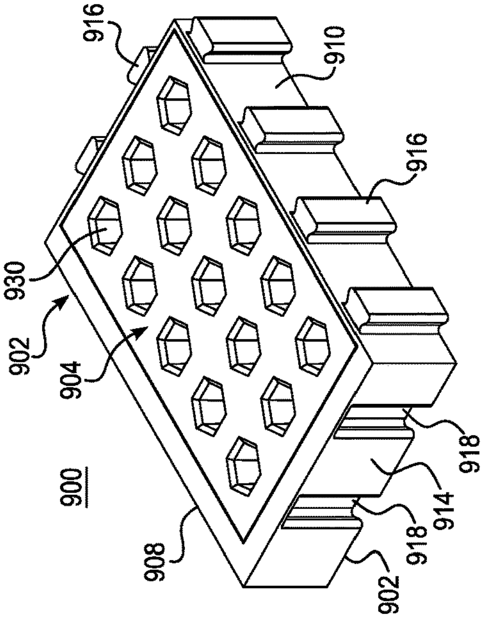
FIG. 15A is a perspective view of another custom tool accessory of the present disclosure specified designed to hold tool bits.

FIGS. 15A and 15B illustrate a custom tool accessory 900 adapted to receive and hold tool bits, for instance, a screwdriver bit. In this regard, the custom tool accessory 900 includes a body 902 for receiving a holder insert 904 within the perimeter of the body. The body 902 includes a base 906 at the bottom of the body, with the base surrounded by side walls 908 and 910 and end walls 912 and 914. Tongues 916 are formed in the side walls 910 and end wall 912, whereas grooves 918 are formed in the side wall 908 and 914. The tongues 916 can be of the same or very similar construction to the tongues described above, for instance, tongue 120. Likewise, the grooves 918 can be of a construction similar to the grooves discussed above, including groove 130. In this regard, the tongues 916 and grooves 918 enable a number of bit holders 900 to be assembled together as desired.

Referring specifically to FIG. 15B, the base 906 is constructed with shallow rectangular shaped depressions 920 for receiving therein a metallic base plate 921. Each of the depressions 920 are formed with a circular hole 922 for receiving a disc shaped magnet 924 therein. The magnets 924 are glued or otherwise affixed to the underside of metallic base plates 921 which in turn are glued or otherwise affixed into the shallow depressions 920. It will be appreciated that the underside of the magnets 924 are coplanar with the bottom surface of the body base 906.

A missing bit indicator in the form of a colored panel 928 overlies the top surface of the body base 906. The holder insert 904 is receivable within the body 902 to overlie the missing bit indicator 928. A series of hexagonal shaped sockets 930 extend downwardly through the holder insert 904 to receive the shank portions of tool bits to be held by the tool bit holder 900. The missing bit indicator 928 is clearly visible at the bottom of the bit sockets 930 to conveniently and clearly indicate the absence of a bit within a socket 930, even in low light conditions.

Although the sockets 930 are illustrated as arranged in rows and columns of equal spacing, the bit sockets 930 can be of different spacing to accommodate, for example, various size of tool bits or various types of tools that may be attached to a hex shank, for example, hex wrench sockets. Since hex wrench sockets vary in size depending on the size of the nut or bolt to be manipulated, in order to provide clearance for the hex wrench sockets the sockets 930 may be required to be of different spacing than shown in FIGS. 15A and 15B.

Figure 16:
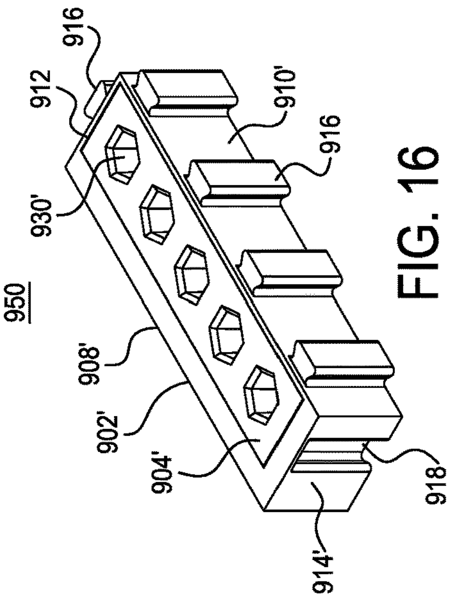
FIG. 16 is an isometric view of another embodiment of the present disclosure also specifically designed to hold tool bits.

FIG. 16 illustrates a bit holder 950 which is constructed similarly to bit holder 900, but with a singular row of bit receiving sockets 930'. Otherwise, the bit holder 950 is of a construction corresponding to the construction of the bit holder 900. As such, the description of the bit holder 900 also applies to the bit holder 950.

Figure 17B:
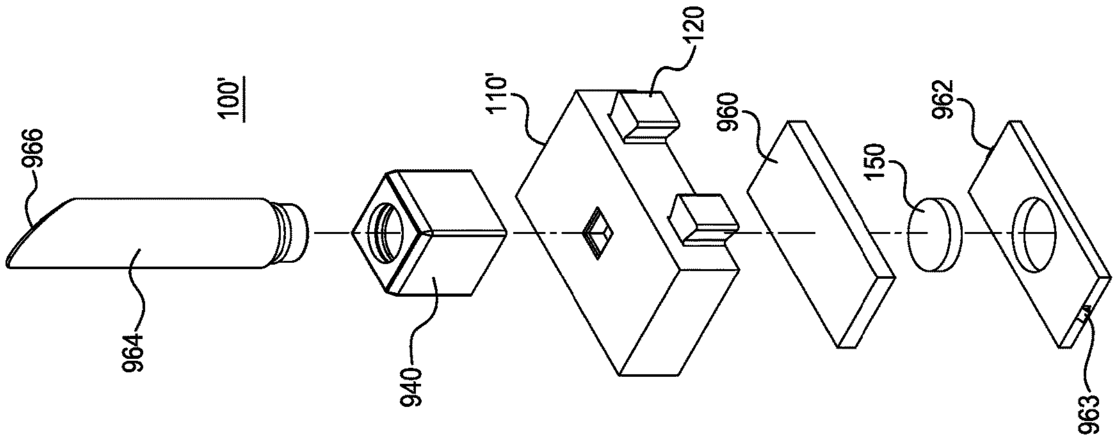
FIG. 17B is an exploded view of FIG. 17A.
Figure 17A:
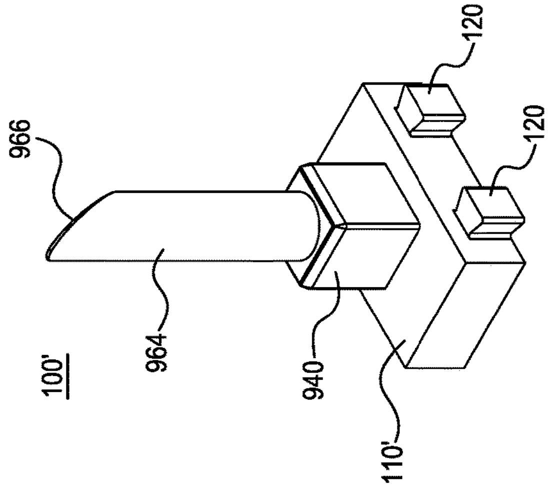
FIG. 17A is an isometric view of a further embodiment of the present disclosure specifically designed to hold sockets.

FIGS. 17A and 17B illustrate custom tool accessory 100' in the form of a socket holder corresponding to the socket holder illustrated in FIGS. 1A-1D and 2A-2D described above. As such, the components of the bit holder 100' that are the same or similar to the custom tool accessories 100 is identified with the same part numbers but with a prime designation.

One difference in the custom tool accessory 100' relative to custom tool accessory 100 is the addition of the metallic base plate 960, glued or otherwise attached to the underside of body 110'. In addition, a circular magnet 150 is adhered to or otherwise attached to the underside of the metallic base plate 960. A retention plate 962 has a circular opening for surrounding the magnet 150 to retain the magnet in position, and also to assist in retaining the base plate 960 in position. The retention plate includes tabs 963 that project from the edges of the retention plate to snugly engage within close-fitting notches provided in the body 110'. Although tabs 963 are shown as projecting from the ends of the retention plate 962, such tabs can also extend from the side edges of the retention plate. Also, the retention plate 962 can be adhered to or otherwise fixedly attached to the underside of the metallic base plate 960.

The retention plate 962 and the underside of the magnet 150 provide a continuous planar surface to present to the surface on which the socket holder 100 is mounted. Unless otherwise described, the custom tool accessories illustrated in the figures to follow are of similar construction, with metallic (steel) base plate attached to the underside of the tool holder, one or more magnets attached to the underside of the base plate, and a retention plate surrounding the magnet(s) and attached to the base of the tool holder. Also, tabs project from the retention plate to mount the retention plate to the tool holder body. In addition, the retention plate can be adhered or otherwise attached to the underside of the base plate.

Figure 19A:
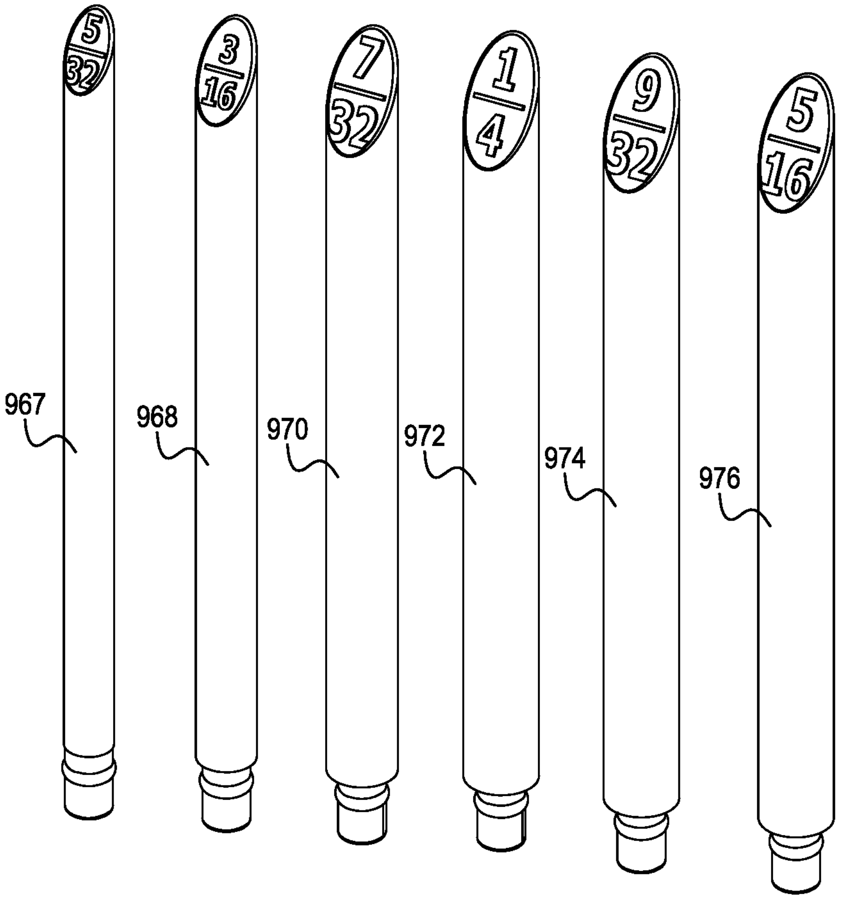
FIG. 19A are identification posts used in conjunction with the embodiments of the present disclosure shown in FIGS. 17A, 17B and 18 indicating the size of the socket being held.

FIGS. 17A and 17B illustrate a stem or post 964, which extends upwardly from the socket receiving portion 940, constructed with a slanted or diagonal top surface 966 which can include indicia, for instance, indicating the size of the socket being held by the custom tool accessory 100'. In this regard, FIG. 19A illustrates a series of posts 967, 968, 970, 972, 974, and 976 each corresponding to a different size socket to be held by the custom tool accessory. The indicia at the top slanted face of the posts indicate the size of the socket being held. The bottom of the posts 964-976 engage within socket receiving portion 940. The socket receiving portion 940 receives the typical square opening in the base of the socket into which the socket wrench extends when the socket is in use.

Figure 18:
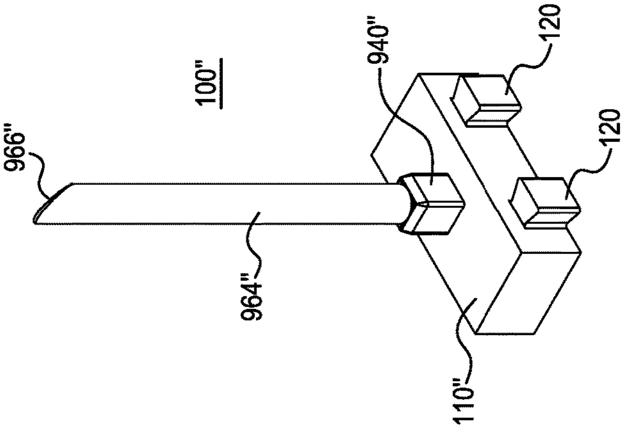
FIG. 18 is an isometric view of another embodiment of the present disclosure specifically designed to hold sockets.

FIG. 18 illustrates a custom tool accessory similar to accessory 100', but designed for sockets with smaller square openings for a smaller size socket wrench. Other than this difference, the custom tool accessory 100' is of the same construction as the custom tool accessory 100' shown in FIGS. 17A and 17B.

Figure 19B:
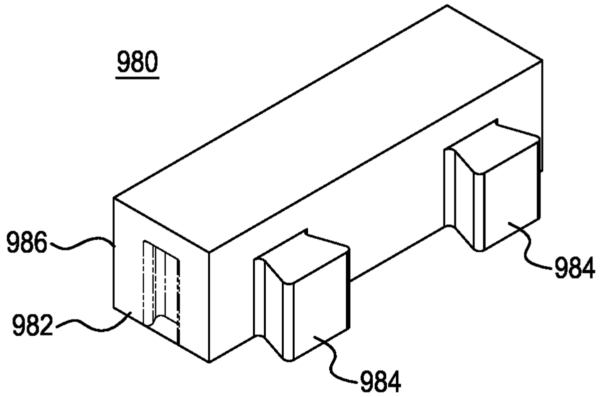
FIG. 19B is an isometric view of a further embodiment of the present disclosure.

FIG. 19B illustrates a spacer 980 for interconnecting socket holders 100, 100', 100", etc. The spacer 980 can be constructed similarly to the socket holders 100' and 100", but without a socket receiving portion 140, 940 or 940'. The purpose of the spacer is to place the socket holders 100, 100' or 100" further apart from each other if needed to provide sufficient spacing for the sockets being held. In this regard, the spacer 980 includes the same tongues 984 and grooves 986 integrated into the spacer base portion or body 982 as in the holders 100, 100' and 100". Further, the spacer 980 can be constructed with or without a magnet, such as magnet 150 or 924, and an associated metallic mounting plate and a retention plate.

It will be appreciated that the spacers, such as spacers 980, can be constructed of various widths so as to achieve a desired spacing between socket holders 100, 100' and 100".

Figure 20A:
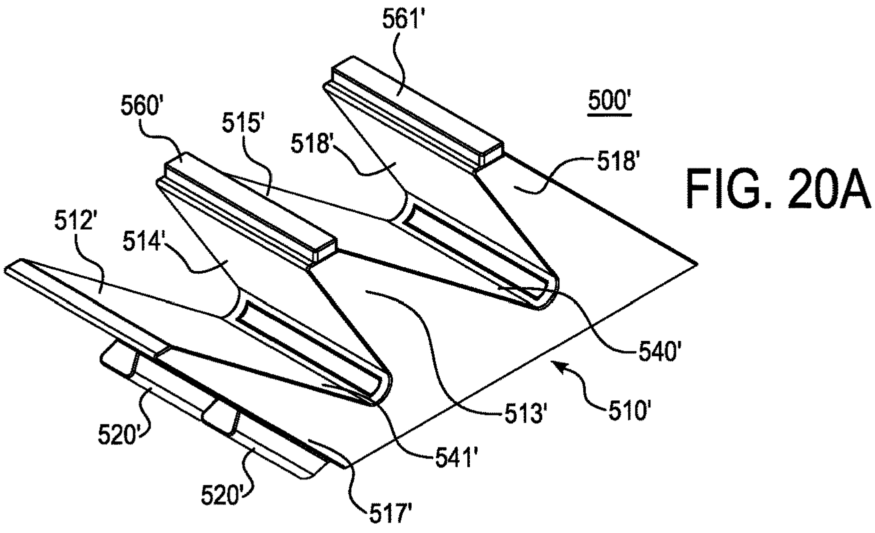
FIG. 20A is an isometric view of another embodiment of the present disclosure.
Figure 20B:
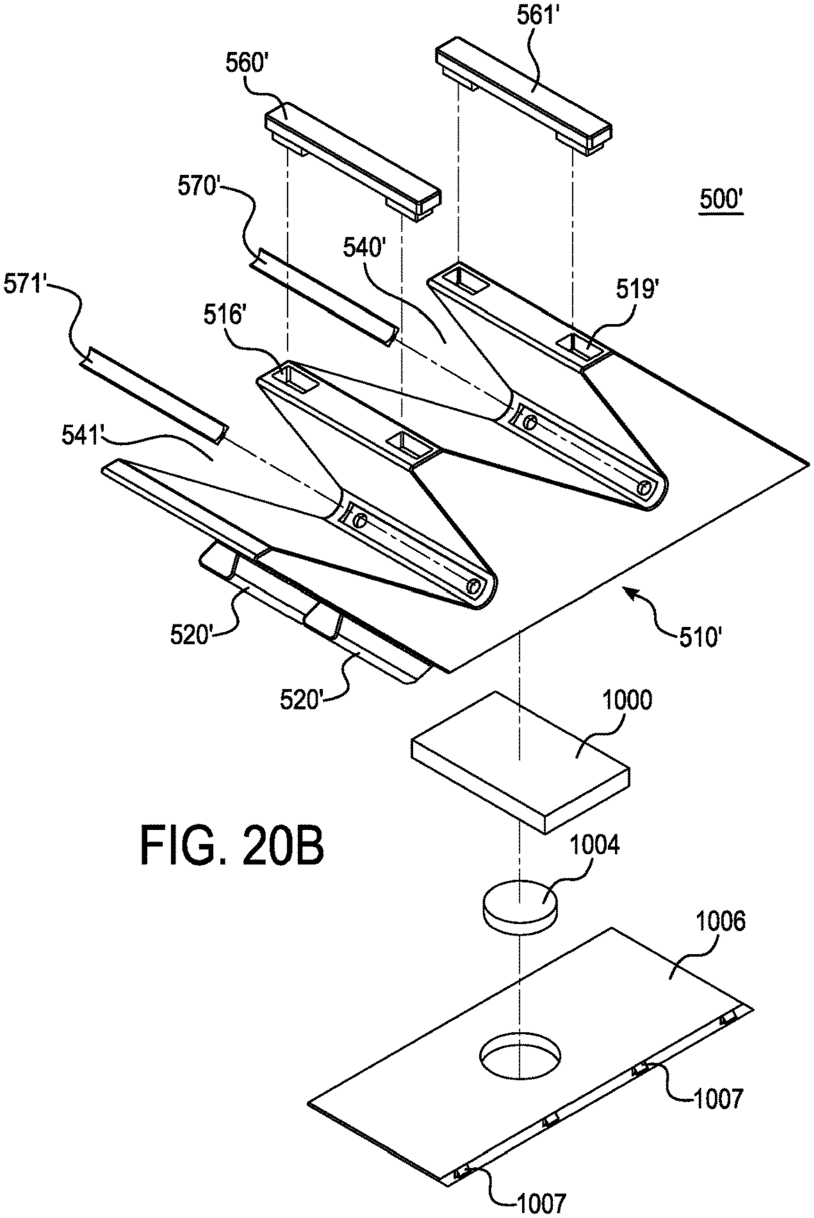
FIG. 20B is an exploded view of FIG. 20A taken from the same perspective as FIG. 20A.
Figure 20C:
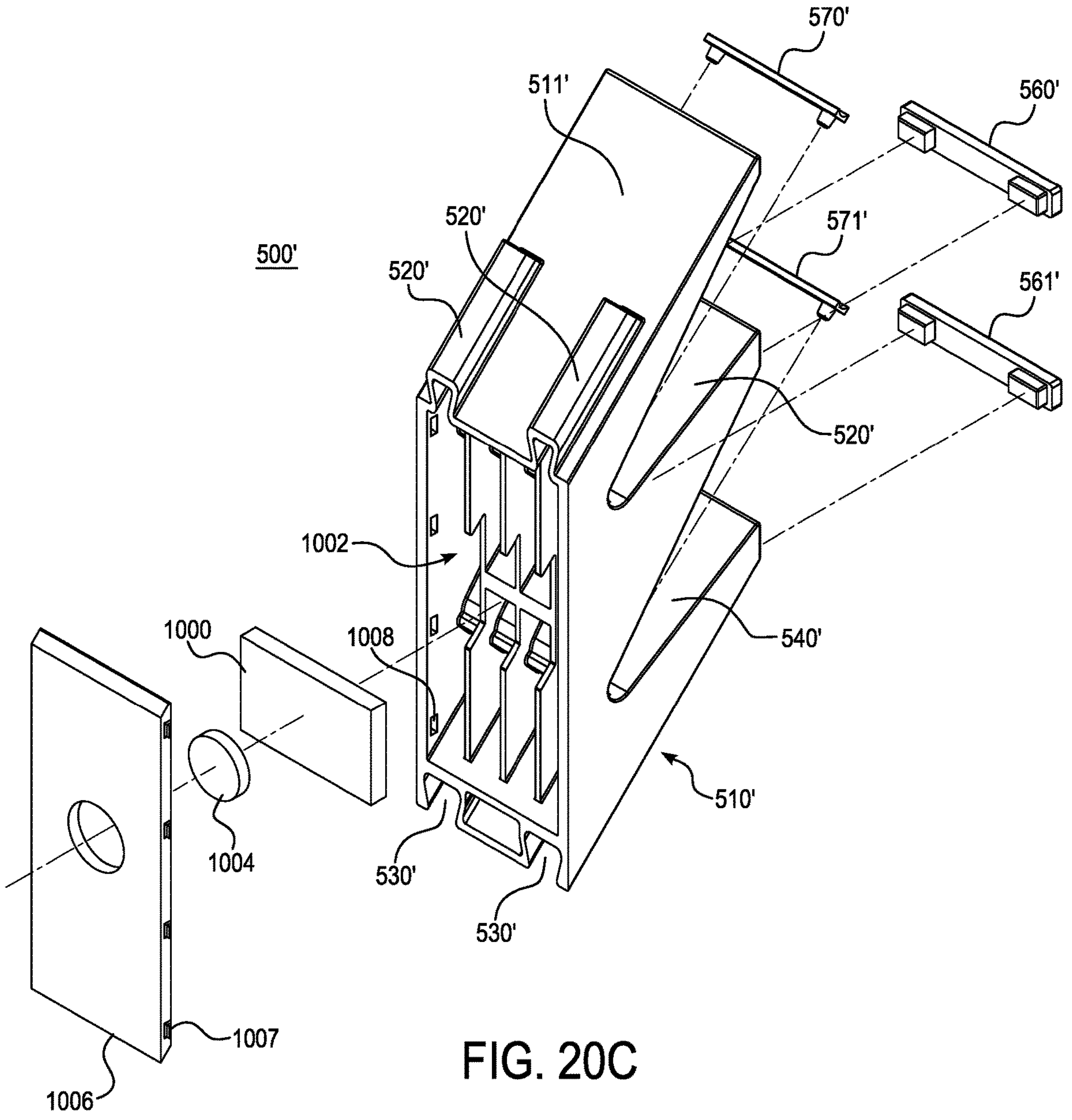
FIG. 20C is a further exploded view of FIG. 20A taken from the bottom side of FIG. 20A.

The tool holder 500' shown in FIGS. 20A, 20B and 20C is similar to the tool holder shown in FIG. 5, but with the tool receiving portions 540 and 541 slanted rather than being vertical. As such, the components of the tool holder 500' are identified with the same part numbers as the tool holder shown in FIG. 5, but with the addition of a prime designation.

In addition, the tool holder 500' includes a metallic base plate portion 1000 affixed to the underside of the body 510'. In this regard, a recess 1002 is formed in the underside of the body 510' for receiving the plate 1000. A circular magnet 1004 is affixed to the underside of the plate 1000 by an adhesive or other means. A retention plate 1006 has a circular opening for closely receiving the magnet 1004 therein and to otherwise close off the bottom of the body 510' so as to form a flat surface on which the tool holder 500' sits. A plurality of tabs 1007 project from the retention plate to engage within blind holes 1008 formed in the side walls.

Figure 21B:
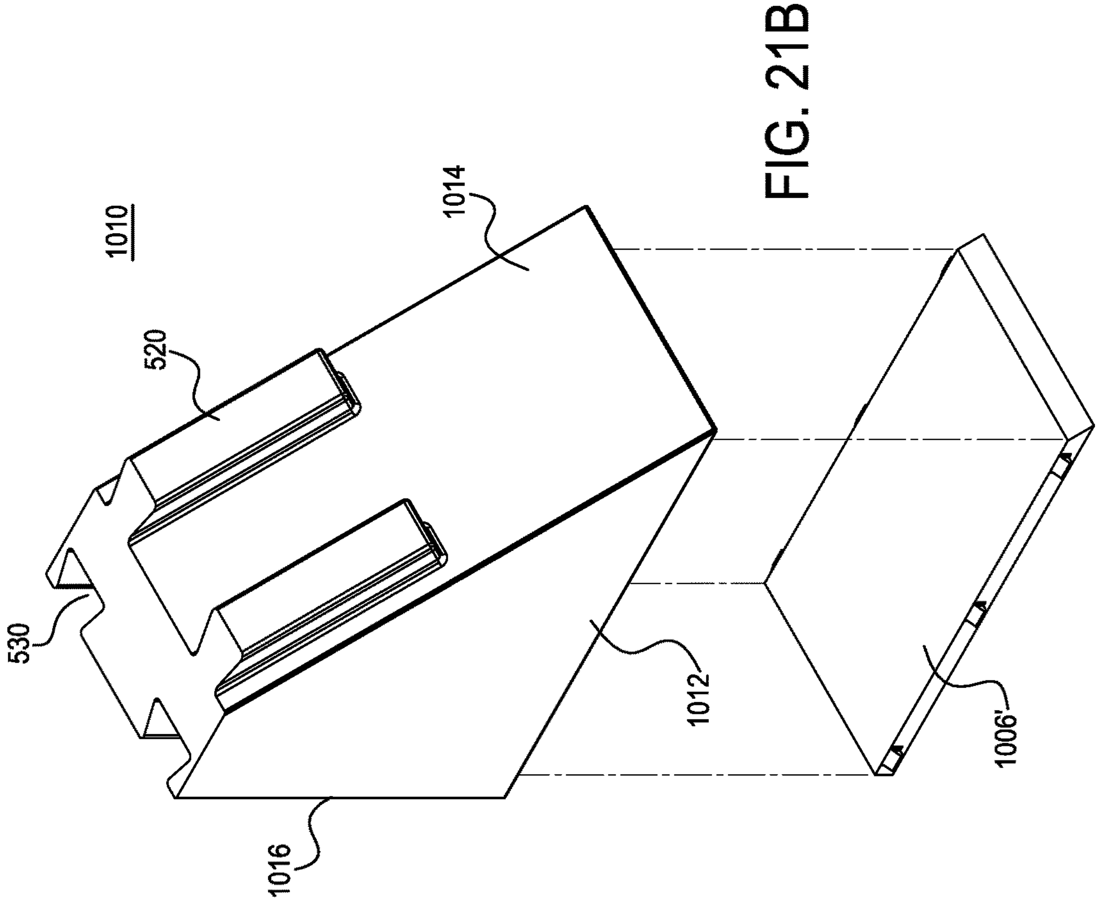
FIG. 21B is an exploded view of FIG. 21A.
Figure 21A:
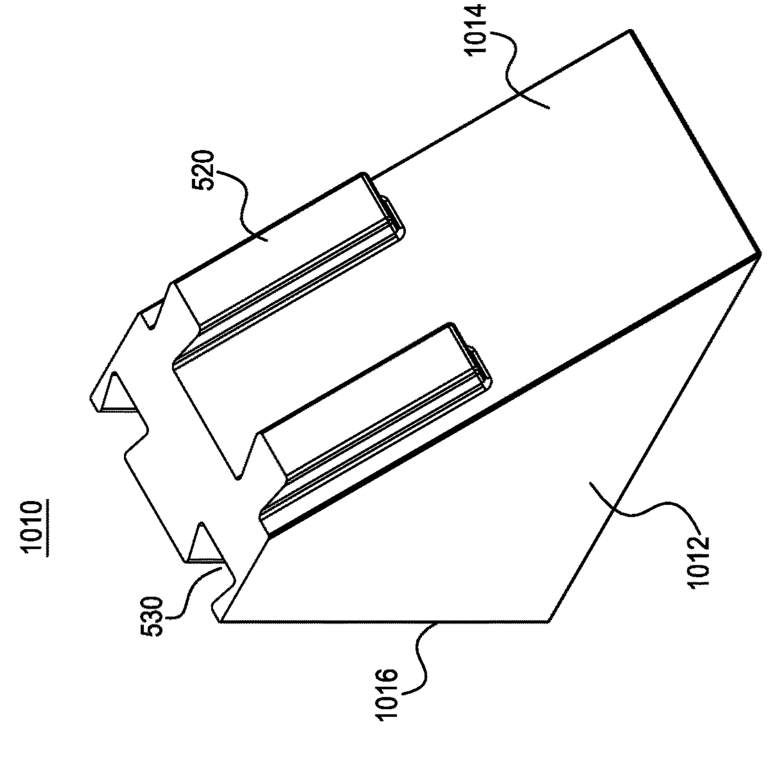
FIG. 21A is an isometric view of a further embodiment of the present disclosure.

FIGS. 21A and 21B illustrate an end connector 1010 for use in interconnecting sloped tool accessories such as 500' to a vertical tool accessory, for instance, tool accessory 500 shown in FIG. 5. To this end, the connector 1010 has a body 1012 with a sloped side 1014 from which the tongue 512 projects. The other surface 1016 is constructed with grooves 530 for receiving vertical tongues, such as tongues 520 shown in FIG. 5. It is to be understood that the positions of the tongues 520 and grooves 530 can be reversed on the connector 1010 than as shown in FIGS. 21A and 21B.

The end connector 1010 can also be constructed with a metallic, magnetically permeable plate, such as plate 1000 shown in FIGS. 20A-20C, as well as a magnet, such as magnet 1004 and a retention plate, such as plate 1006. Alternatively, the end connector 1010 can be constructed without a base plate, retention plate, or magnet since the connector 1010 will not per se be holding a tool.

Figure 22:
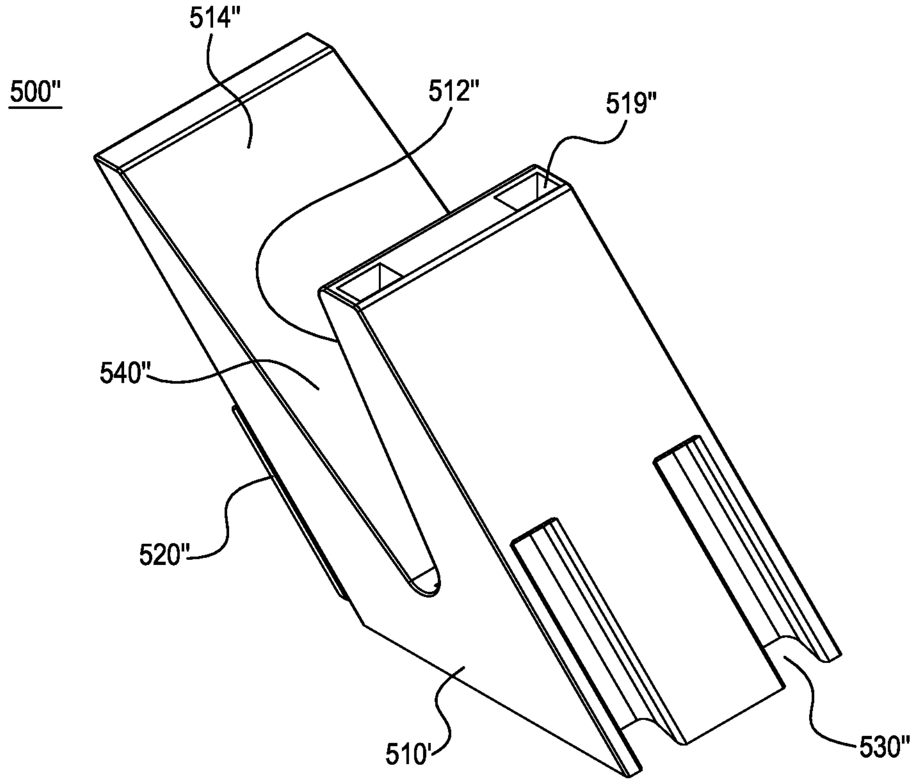
FIG. 22 is an isometric view of a further embodiment of the present disclosure.

FIG. 22 illustrates a tool holder 500" that is similar to tool holder 500', but constructed to hold a singular tool within the tool receiving portion 540". In other respects, the tool holder 500" is constructed similarly to the tool holder 500', including with a metallic base plate and magnet attached thereto, which are not visible, in FIG. 22, as well as with a retention plate similar to retention plate 1006, which also is not visible in FIG. 22.

Figure 23A:
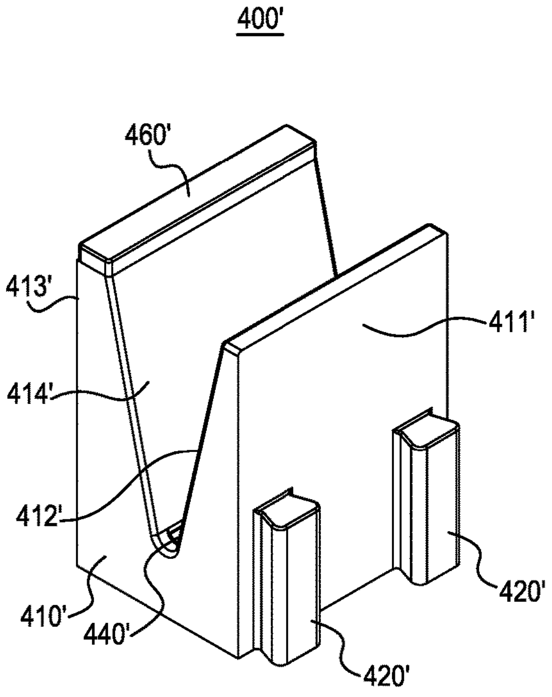
FIG. 23A is an isometric view of a further embodiment of the present disclosure specifically adapted to hold wrenches.
Figure 23B:
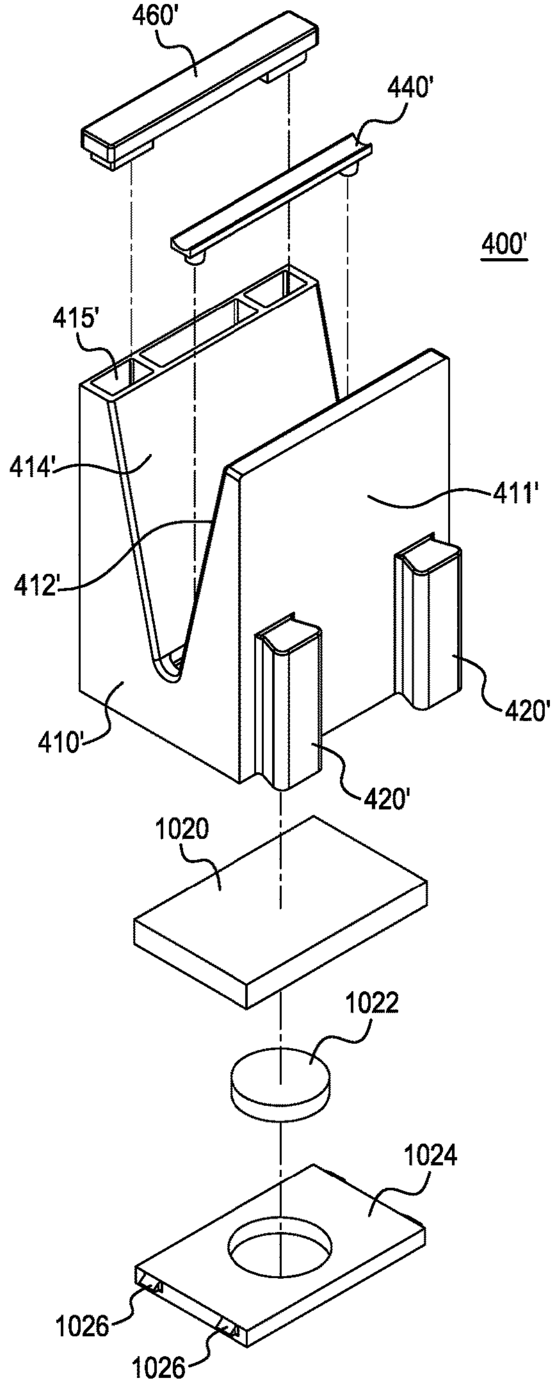
FIG. 23B is an exploded view of FIG. 23A.

Referring to FIGS. 23A and 23B, a custom tool accessory 400' is illustrated of a configuration to hold various types of tools, including wrenches. The custom tool holder 400' is similar in construction and function to the custom tool holder 400 shown in FIGS. 4A, 4B, 4C and 4D. As such, the aspects of the construction of the custom tool holder 400' that are the same or similar to that of custom tool holder 400 will not be repeated.

However, the custom tool holder 400' does include a base plate 1020 which is fixedly attached to the underside to the body 410' of the holder 400'. As in other embodiments of the present disclosure, a disc shaped magnet 1022 is adhered or otherwise fixedly attached to the underside of the metallic base plate 1020. Further, a retention plate 1024 is affixed to the underside of the base plate 420. Tabs 1026 project from the ends of the retention plate 1006 to snap into close fitting blind holes formed in the base of body 410', thereby to hold the retention plate 1024 firmly in place beneath the tool holder 400'.

The retention plate 424 has a circular through opening for receiving the magnet 1022 therein. This allows the magnet 1022 to adhere to the metallic surface on which the tool holder 400' is positioned, while also providing a flat, stable surface for the tool holder 400'. Other than with respect to the use of the base plate 1020, the magnet 1022 and retention plate 1024, the custom tool holder 400' is similar in construction to the tool holder 400 described above.

Figure 24A:
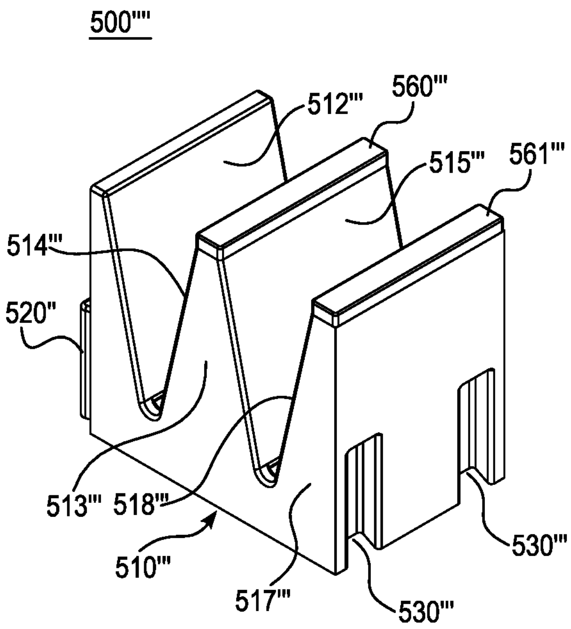
FIG. 24A is an isometric view of a further embodiment of the present disclosure.
Figure 24B:
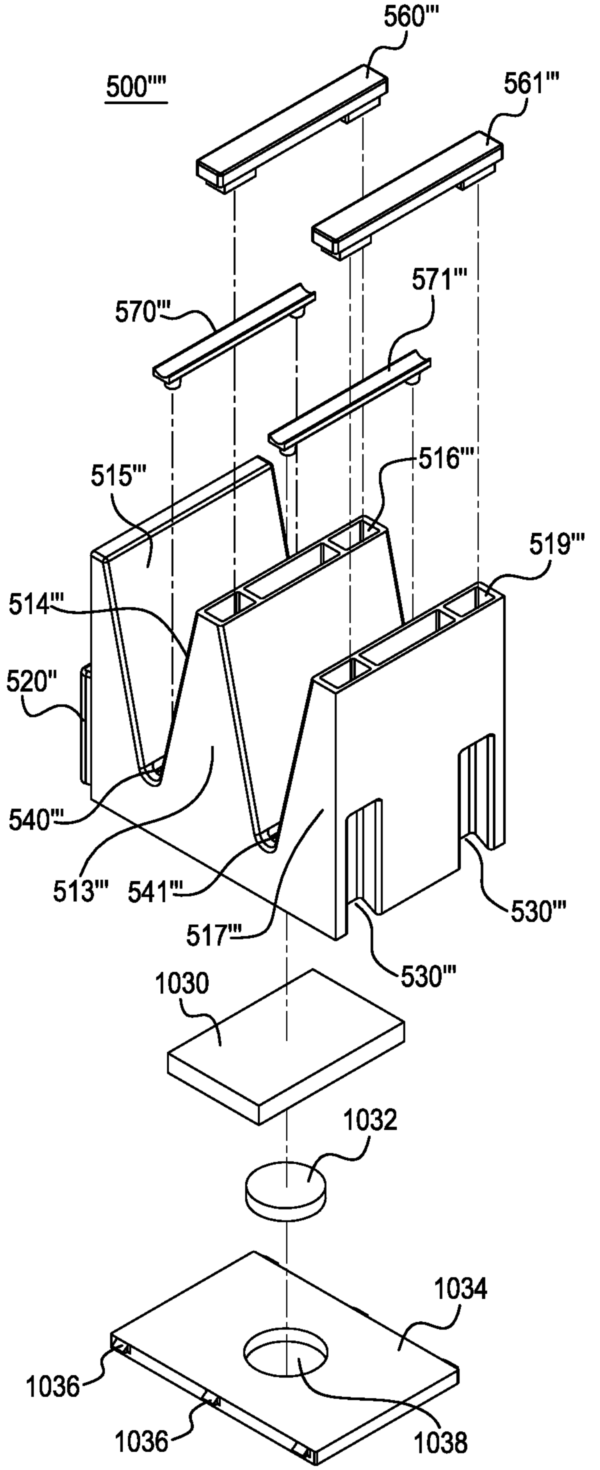
FIG. 24B is an exploded view of FIG. 24A.

Next, referring to FIGS. 24A and 24B, the custom tool holder 500'" is constructed similarly to the tool holder 500 shown in FIG. 5 above, but with the differences in construction as described following. The tool holder 500'", as with the tool holder 500, is capable of holding multiple tools, for example, wrenches. Further, it is to be appreciated that tool holders similar to tool holders 500'" can be constructed to hold more than two tools, for example, three, four, five, etc., tools.

Referring initially to FIG. 24B, the tool holder 500'" includes a metallic base plate 1030 that is secured to the underside of the tool holder body 500'" by any convenient means, such as with an adhesive. A disc shaped magnet 1032 is adhered or otherwise affixed to the bottom side of the metallic plate 1030. Also, a rectangularly shaped retention plate 1034 is affixed to the underside of the body 510'". The retention plate 1034 includes tabs 1036 that protrude laterally from the side edge of the retention plate to snap into close fitting blind holes formed at the bottom portion of body 510'" to securely hold the retention plate in place.

The retention plate 1034 has a circular opening 1038 for receiving the magnet 1032 closely therein. As such, the underside of the magnet 1032 is flush with the underside of the retention plate 1034. As a result, the tool holder 500'" is securely held in place on a magnetic surface on which the tool holder is placed. Further, the retention plate 1034 provides a flat, stable surface for the underside of the tool holder 500'".

Figure 25A:
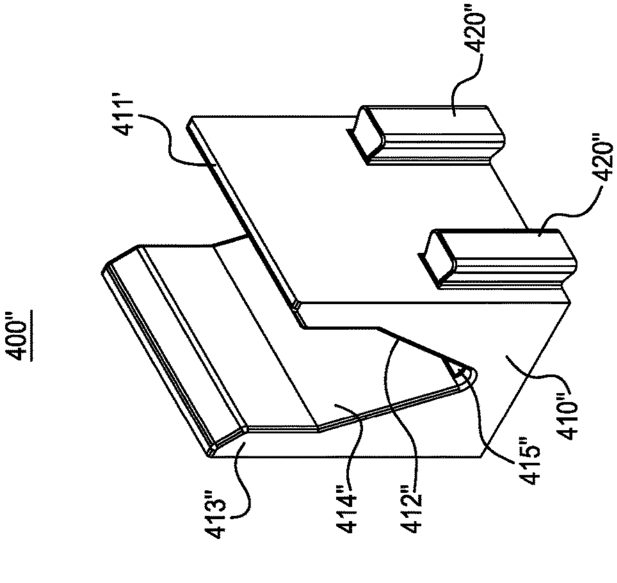
FIG. 25A is an isometric view of a further embodiment of the present disclosure.
Figure 25B:
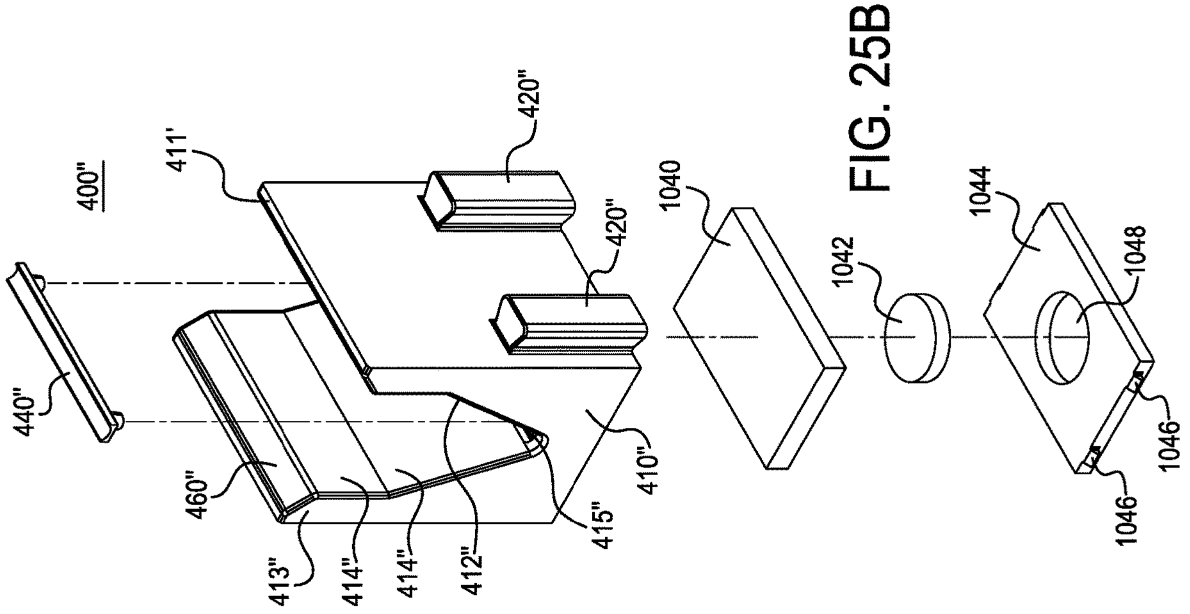
FIG. 25B is an exploded view of FIG. 25A.

Next, referring to FIGS. 25A and 25B, a custom tool holder 400" is illustrated as being of a construction similar to tool holder 400, but with the interior surfaces 412" and 414" having a lower inclined section and an upper vertical section adapted to receive various types of tools therein, for instance, the handles of a pair of pliers or the handles of snips or other tools.

The custom tool accessory 400" includes a metallic base plate 1040 that is adhered or otherwise affixed to the underside of the tool body 410". A disc shaped magnet 1042 is adhered or otherwise affixed to the underside of the metallic base plate 1040. A retention plate 1044 is adhered or otherwise affixed to the underside of the base plate 1040. Tabs 1046 project from the end edges of retention plate 1044 to snap into close fitting blind holes formed in the base portion of body 410".

The retention plate 1044 has a circular opening 1048 therethrough for closely receiving the disc shaped magnet 1042 therein. The underside of the retention plate 1044 is co-extensive with the underside of the disc shaped magnet 1042 thereby to present a uniform flat plane to the surface on which the tool holder 400" is mounted. As in the other embodiments of the present disclosure, the magnet 1042 securely holds the tool holder 400' in place on a magnetic surface.

Figure 26:
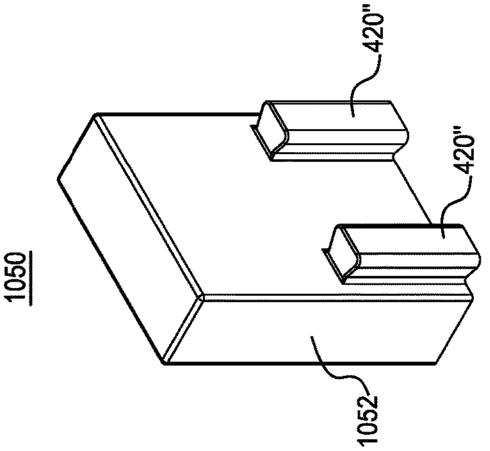
FIG. 26 is an isometric view of a further embodiment of the present disclosure.

Next, FIG. 26 illustrates a spacer 1050 which is of a height and width similar to the height and width of the walls 411" and 413" of the holder 400" shown in FIGS. 25A and 25B. The spacer 1050 functions to space apart holders such as holder 400" so that enough clearance is provided between the tools being held by the holder 400", or other types of holders with which spacer 1050 may be connected. As such, the side wall 1052 of the spacer 1050 can be of various widths so as to provide the amount of clearance desired between holders, such as holders 400". Further, the spacer 1050 includes the same tongues 420" as used in the tool holder 400". The spacer 450 also includes grooves, which are not visible, of the same construction as in the holders 400 and 400". Also, the spacer 1050 can be constructed with the base plate, a disc shaped magnet and a retention plate similar to corresponding components 1040, 1042 and 1044 discussed above with respect to holder 400".

Figure 27:
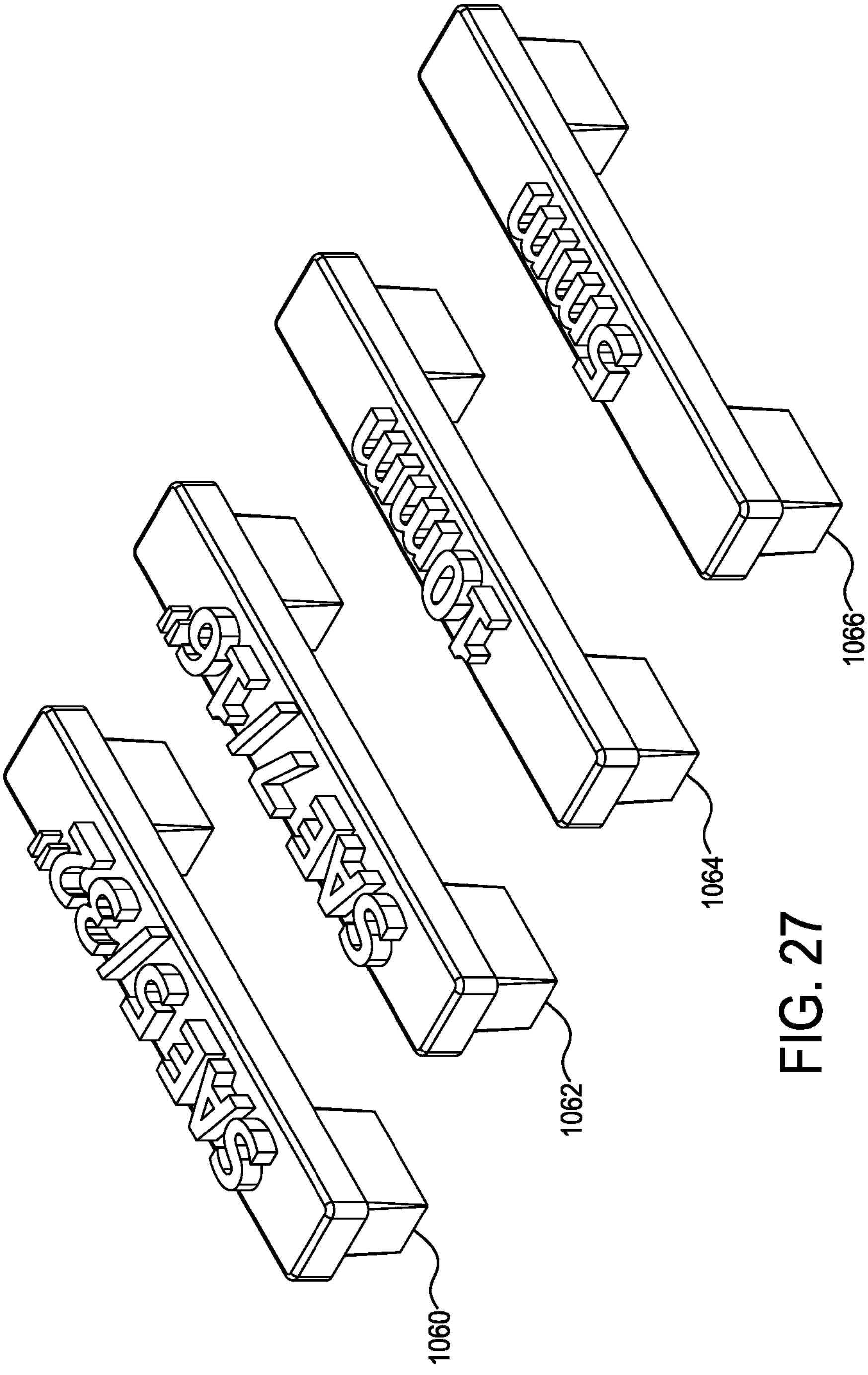
FIG. 27 illustrates isometric views of further embodiments of the present disclosure showing examples of indicia utilized with tool holders of the present disclosure.

FIG. 27 illustrates various configurations of labels 1060, 1062, 1064 and 1066 that may be used in conjunction with the various tool holders of the present disclosure, for instance, with tool holders 400, 400', 400", 500, 500', 500", 500'" as discussed above. Labels 1060 and 1062 indicate, for example, SAE wrench sizes $5/16^{th}$ inch and $7/16^{th}$ inch. Labels 1064 and 1066 indicate metric wrench sizes of 10 mm and 5 mm. Of course, other indicia could be utilized. Further, the indicia and/or the entire label can be a particular color corresponding to whether the designated tool is an SAE or a metric sized tool.

Figure 28A:
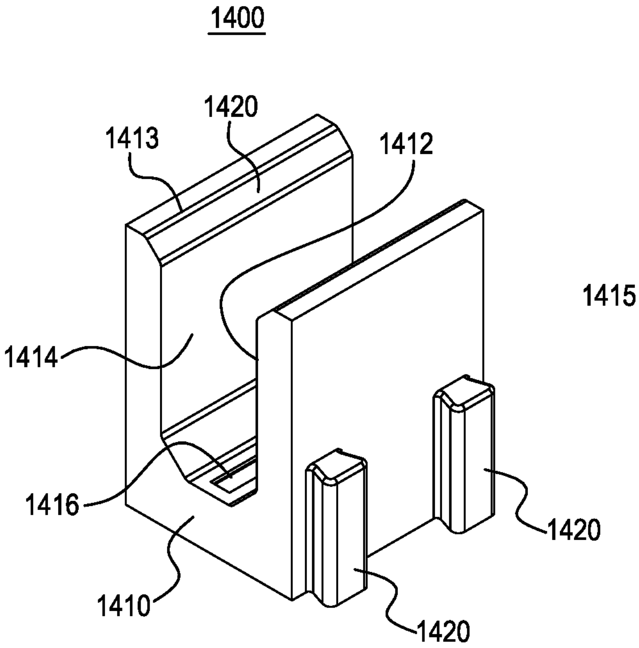
FIG. 28A is an isometric view of a further embodiment of the present disclosure.
Figure 28B:
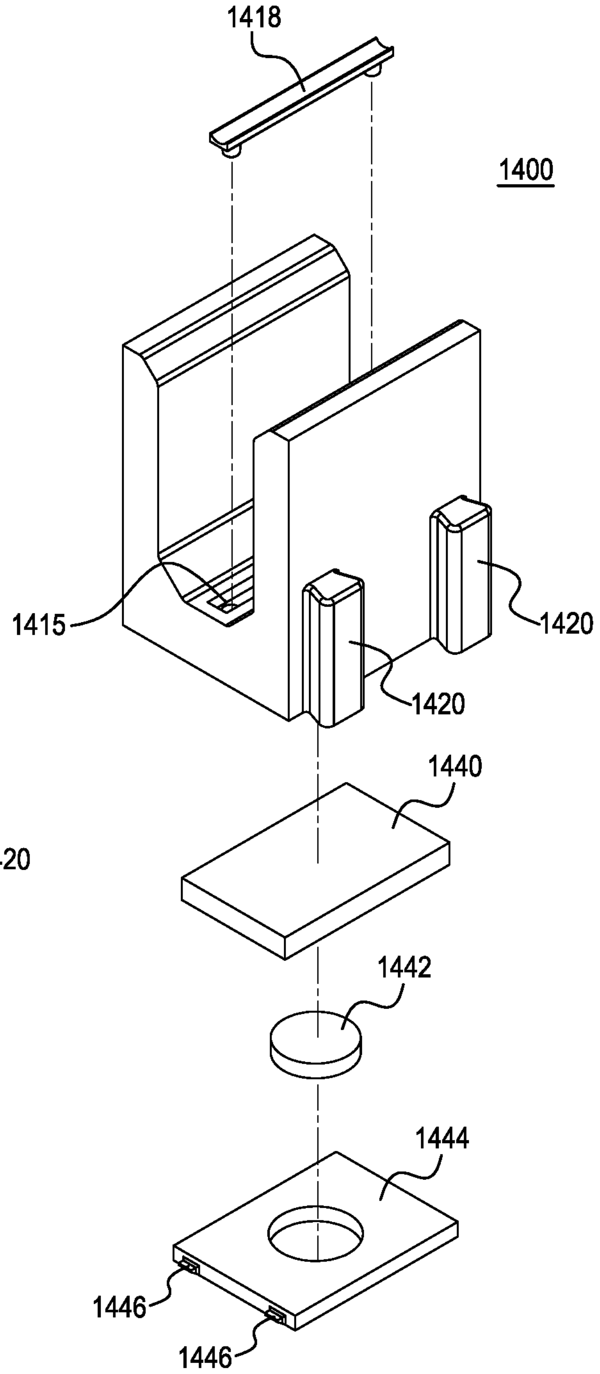
FIG. 28B is an exploded view of FIG. 28A.

FIGS. 28A and 28B illustrate another embodiment of a custom tool holder 1400 that is similar in construction to the custom tool holder 400" of FIGS. 25A and 25B. As such, the comparable components of the custom tool holder 1400 that correspond to the custom tool holder 400" is given the same basic part number but of a 1400 series. One difference between the tool holder of FIGS. 28A and 28B from that shown in FIGS. 25A and 25B is that the tool holder 1400 has walls 1411 and 1413 with a longer vertical wall inside surface 1412 and 1414 and a shorter diagonal surface at the bottom thereof. In this regard, the tool holder 1400 is adapted to perhaps more conveniently hold tools with rounded or elliptical members, such as a hammer or perhaps screwdriver handles. As in the tool holder 400", the tool holder 1400 includes a base plate 1440, a disc shaped magnet 1442, a retention plate 1444, and tabs 1446 which are constructed and function in a manner comparable to the corresponding components 1040, 1042, 1044, tabs 1046, as described above.

Figure 29A:
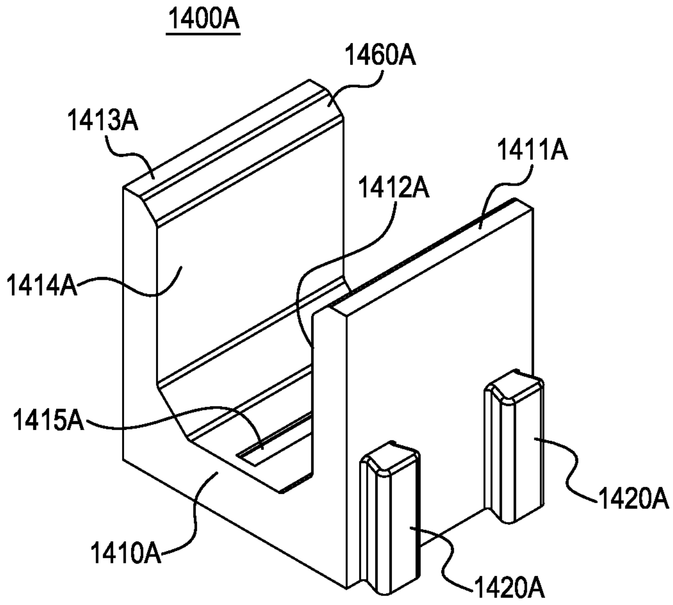
FIG. 29A is an isometric view of a further embodiment of the present disclosure.
Figure 29B:
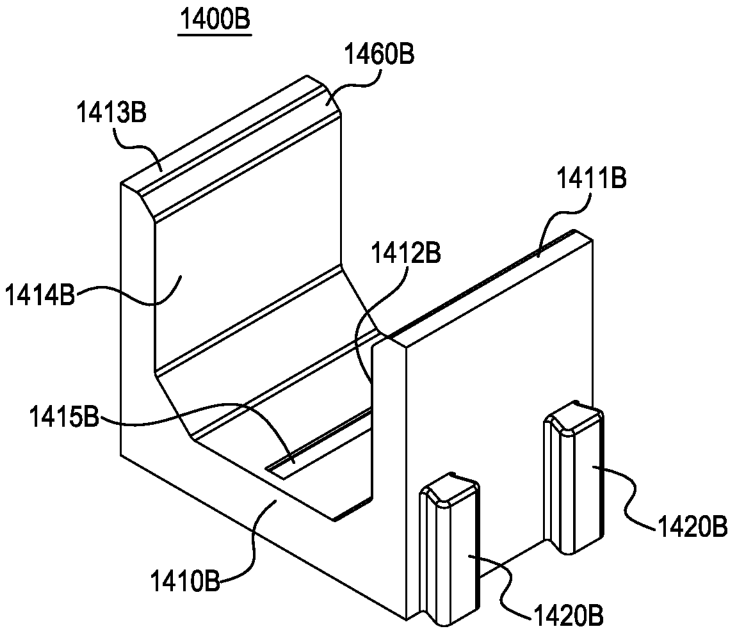
FIG. 29B is an isometric view of a further embodiment of the present disclosure.
Figure 29C:
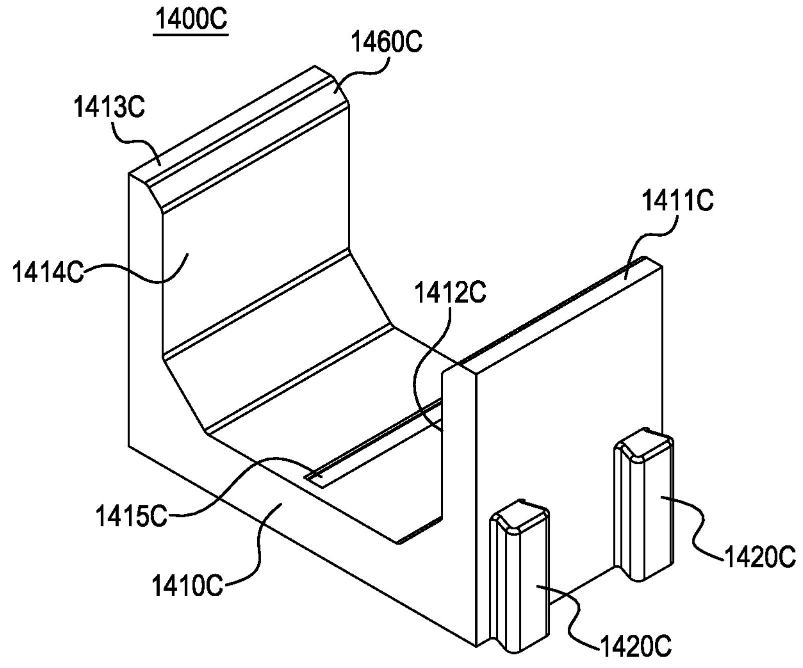
FIG. 29C is an isometric view of a further embodiment of the present disclosure.
Figure 29D:
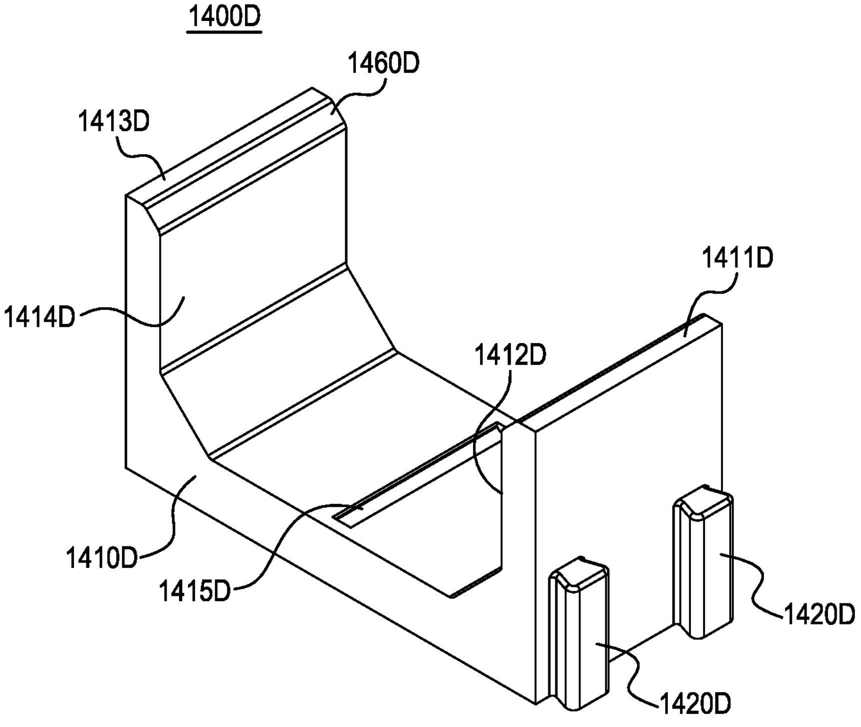
FIG. 29D is an isometric view of a further embodiment of the present disclosure.

FIGS. 29A, 29B, 29C and 29D disclose tool holders in which the gap separating the vertical walls 1411 and 1413 are progressively wider than shown in FIGS. 28A and 28B. In other respects, the tool holders 1400A, 1400B, 1400C and 1400D are the same as described above with respect to 1400. As such, the components of the holders 29A, 29B, 29C and 29D are identified by the same part numbers as in FIGS. 28A and 28B, but with the suffixes "A", "B", "C" and "D". One possible difference in the tool holders 29A, 29B, 29C and 29D is that as the tool holder gets progressively larger, for example, as shown in FIGS. 29C and 29D, a larger base plate 1440 may be used or perhaps two base plates 1440 may be utilized, and a disc shaped magnet 1442 as well as a retention plate 1444 used in conjunction with each of the base plates 1440. Also, perhaps two magnets may be used with larger base plates.

Figure 30A:
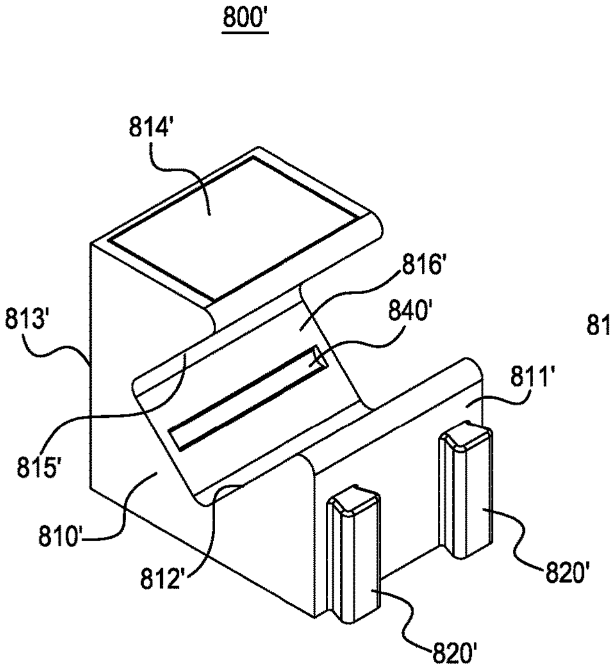
FIG. 30A is an isometric view of a further embodiment of the present disclosure.
Figure 30B:
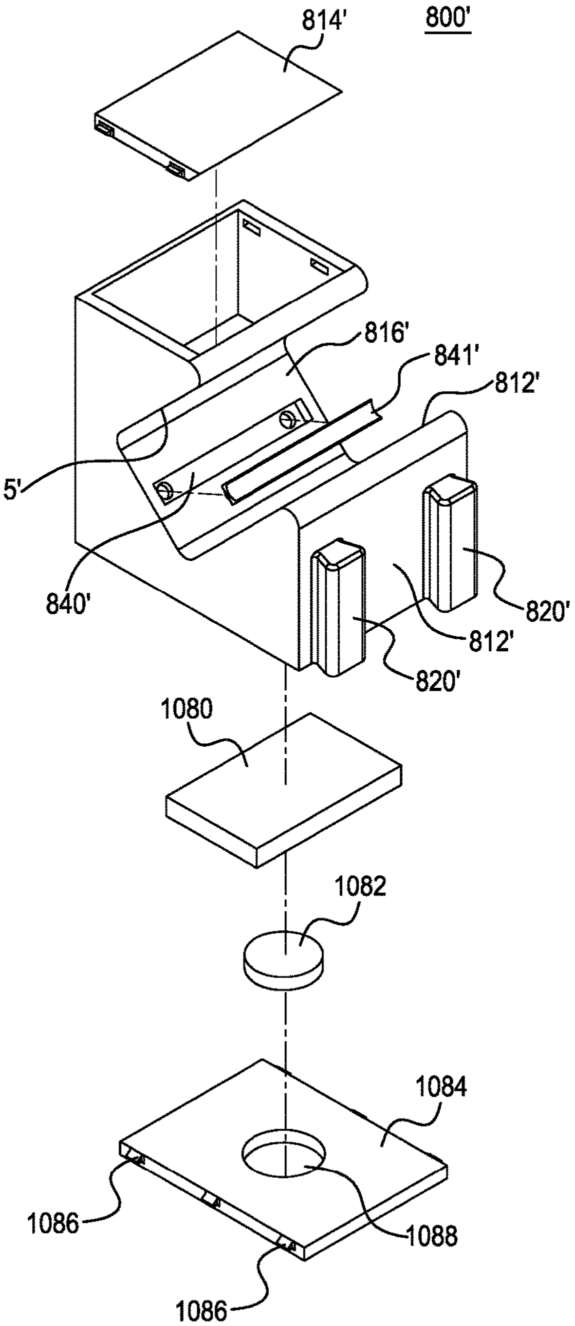
FIG. 30B is an exploded view of FIG. 30A.

Next, referring to FIGS. 30A and 30B, a custom tool accessory 800' is illustrated as of a construction similar to custom tool accessory 800 shown in FIGS. 8A-8D, described above. The custom tool holder 800' is very similar in construction to the custom tool holder 800, but with the missing tool indicator 841' disposed in the tool receiving portion 816' rather than positioned in the inclined surface 812'.

In addition, the tool holder 800', shown in FIGS. 30A and 30B, includes a rectangularly shaped base plate 1080 affixed to the underside of the tool holder body 810'. A disc shaped magnet 1082 is adhered or otherwise fixedly attached to the underside of the metallic base plate 1080. In addition, a retention plate 1084 underlies the body 810' to function as a base for the body. Tabs 1086 project from the side margins of retention plate 1034 to snap into close fitting blind holes formed in the base portion of body 810' thereby to securely hold the retention plate affixed to the body 810'.

The retention plate 1084 includes a circular opening 1088 formed therein for closely receiving the magnet 1082 therein. By this construction, as described above with respect to other examples of the present disclosure, the magnet 1082 securely holds the tool holder in place on a metallic tool receiving surface, and the retention plate 1084 provides a stable base for the tool holder 800'.

FIGS. 31A-31E depict a further embodiment of the present disclosure wherein the tool holder 1450 may be of an adjustable width thereby to replace one or more of the tool holders 1400, 1400A, 1400B, 1400C, and 1400D described above. The exterior shape of the tool holder 1450 corresponds to the tool holders 1400, 1400A, 1400B, 1400C, and 1400D. In this regard, the tool holder 1450 is constructed with a first female half 1452 and a second male half 1454. The female half 1452 is constructed with sockets 1456 built in to the exterior side of the vertical wall 1458. Also, in a manner similar to the tool holders 1400, 1400A, 1400B, 1400C and 1400D, the male section 1454 is constructed with a pair of upright/vertical tongues 1460 that are sized to engage within the corresponding grooves 1456.

As in the tool holder 1400, the tool holder 1450 also utilizes a base plate 1463 mounted to the underside of the male section 1454. A pair of disc shaped magnets 1464 are adhered to or otherwise affixed to the underside of the base plate 1463. In addition, a retention plate 1466 is adhered to or otherwise attached to the underside of the base plate 1463. Although not shown, tabs, similar to tabs 1446 or 1086, project from the margins of the retention plate 1466 to snap into close fitting openings formed in the base of the male section 1454 to securely affix the retention plate 1466 with the male section.

The retention plate 1466 includes a pair of circular openings 1468 for receiving the magnets 1464 closely therein. When the base plate 1462, magnets 1464 and retention plate 1466 are assembled, the underside of the magnets and the retention plate 1466 is coplanar with the underside of the holder 1450 so as to present a flat coplanar surface to the mounting location of the tool holder.

A missing tool indicator in the form of an elongate strip or member 1469 is closely receivable within a groove or channel 1470 extending along the tool receiving portion 1472 in a manner similarly to the tool holders 400, 1400, 1400A, 1400B, 1400C and 1400D.

As indicated above, the tool holder 1450 is designed to be adjustable in size. In this regard, the male holder half 1454 includes an elongated ratchet tongue portion 1480 extending horizontally from a lower part thereof to engage within a groove 1482 formed in the base portion of the female half 1452. The groove is defined by a pair of side walls 1484 and 1486 that extend parallel to the exterior sides of the ratchet tongue 1480. The side walls 1484 and 1486 include upwardly extending slots 1488 and 1490 for receiving therein a transverse pawl bar 1492. The pawl bar 1492 is adapted to slide along its length within the slots 1488 and 1490. The pawl bar 1492 is constructed with an upwardly projecting lug 1494 that is engageable within one of a series of close fitting lateral slots 1496 extending laterally from the side of a longitudinal slot 1498 formed along the length of the ratchet tongue 1480.

Figures 31A, 31B, 31C:
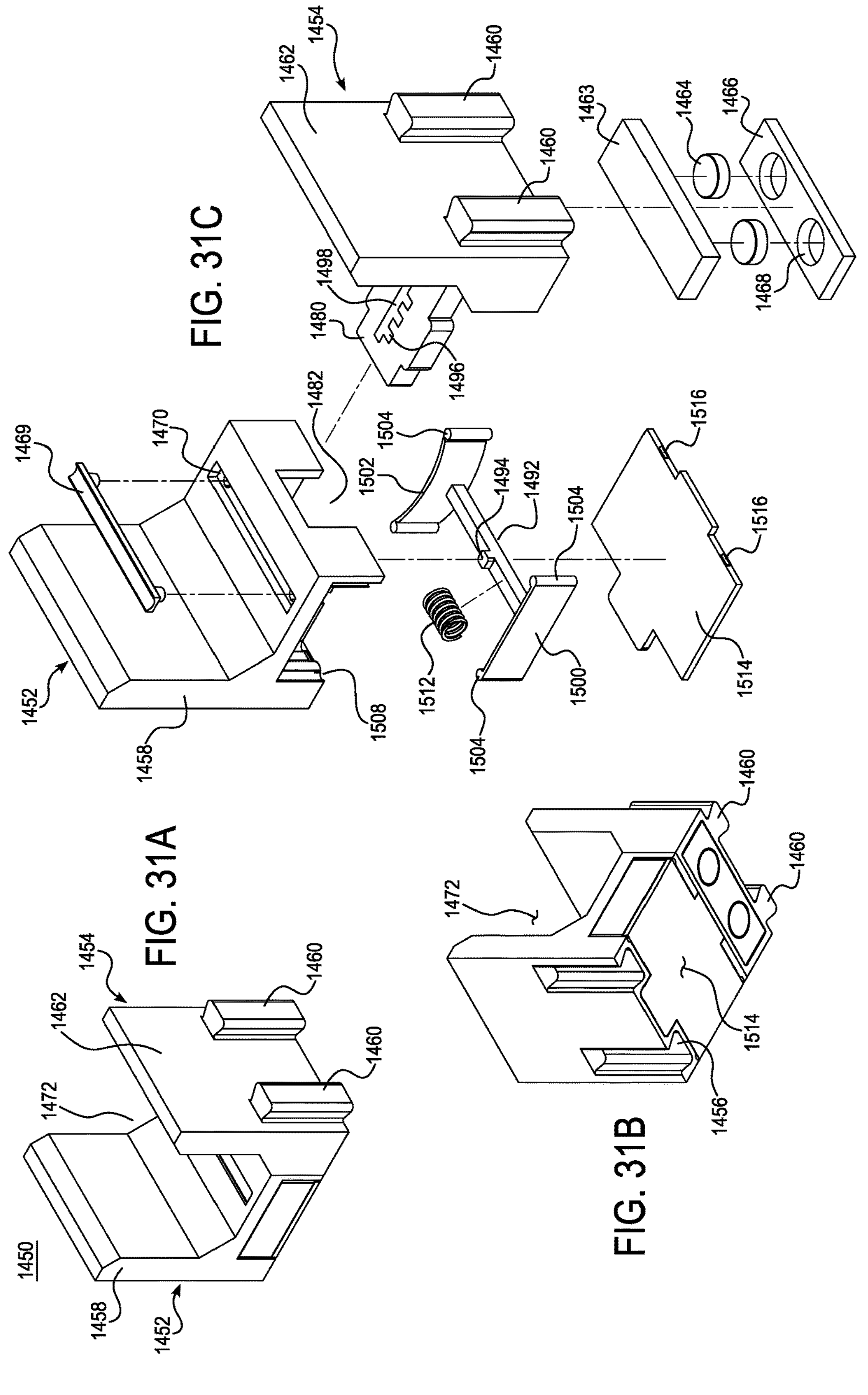
FIG. 31A is an isometric view of a further embodiment of the present disclosure taken from above the illustrated tool holder.
FIG. 31B is an isometric view of FIG. 31A taken from below FIG. 31A.
FIG. 31C is an exploded view of FIG. 31A.
Figure 31D:
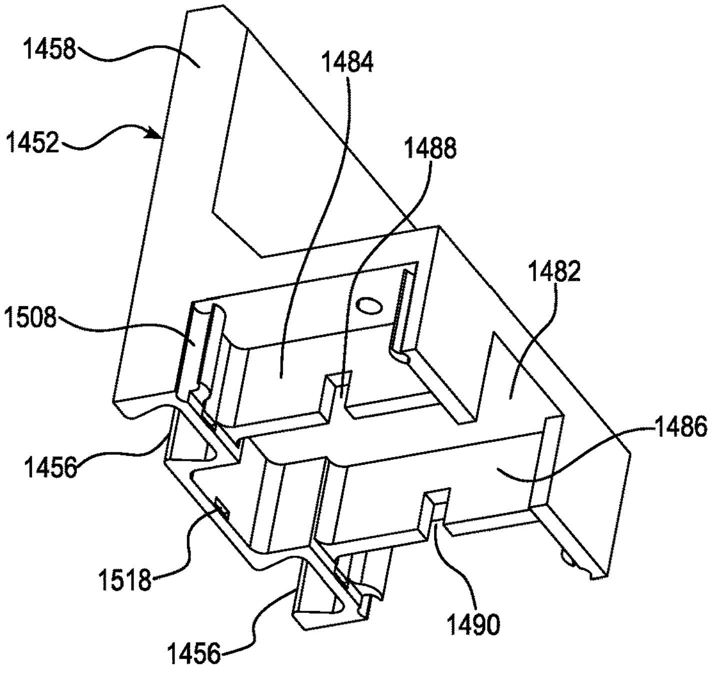
FIG. 31D is a fragmentary isometric view of FIG. 31C.
Figure 31E:
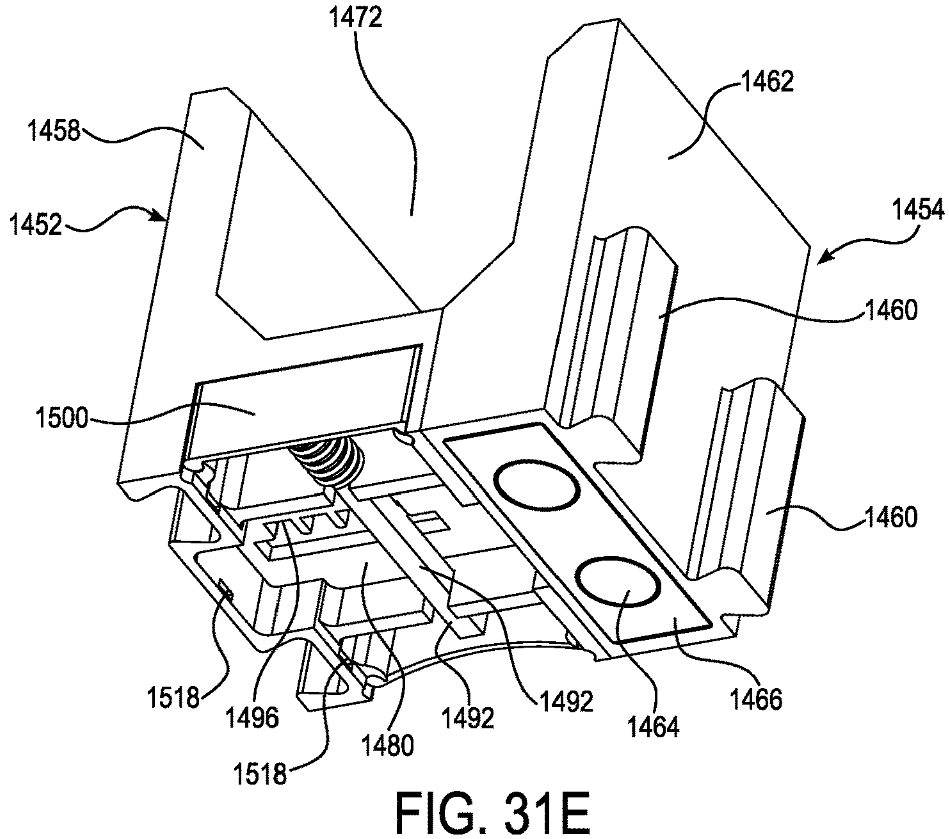
FIG. 31E is an isometric view of FIG. 31A taken from below FIG. 31A with parts removed to view the interior of the tool holder.

The ends of the pawl bar 1492 are attached to end panels 1500 and 1502, with end panel 1502 being bowed or arcuate inwardly as shown in FIG. 31C. The end panels 1500 and 1502 are constructed with enlarged rounded end edges 1504 that are receivable within vertical, arcuate shaped channels 1508 formed in the base portion of the holder half 1452. The arcuate channels 1508 closely receive the circular upright end portions 1504 at each end of the end panels 1500 and 1502. In this manner, the pawl bar 1492 and end panels 1500 and 1502 are held captive within the base portion of the holder half 1452.

A compression spring 1512 acts between side wall 1484 and the end panel 1500 to bias the pawl bar 1492 in the direction towards the end panel 1500, which in turn biases the lug 1494 into a lateral slot 1496.

A bottom plate 1514 covers the underside of the base of the holder half 1452. Tabs 1516 project from the side margins of bottom cover plate 1514 to snap fit into blind holes 1518 formed in the lower portion of hold half 1452.

The separation between the holder halves 1452 and 1454 is accomplished by pressing inwardly against the end panel 1500, thus compressing the spring 1512 so that the lug 1494 is no longer seated within the lateral slot 1496 and instead is positioned within the longitudinal slot 1498. This allows the male half 1454 to be adjustable relative to the female half 1452 by sliding the tongue 1480 relative to the slot 1482. Once a new position is reached, the end panel 1500 is released so that the lug 1494 can seat within a different lateral slot 1496. It will be appreciated that the end panel 1502 is flexed under the force of the user pushing on end panel 1500. However, when no force is applied to end panel 1500, the end panel 1502 resumes its flexed (arcuate) shape so as to help lock the lug 1494 into a corresponding lateral slot 1496.

While illustrative embodiments have been illustrated and described, it will be appreciated that various changes can be made therein without departing from the spirit and scope of the invention.

The invention claimed is:

1. A modular custom mechanic's tool accessory to hold a plurality of mechanic's tools, the custom tool accessory comprising modular mechanic's tool holders that are interconnectable to cooperatively hold a plurality of mechanic's tools, each mechanic's tool holder comprising:

a base section;

a first upright wall having an inner surface projecting upward from the base section and having an upright outer surface opposite to the inner surface; and a second upright wall spaced from the first upright wall, the second upright wall having an inner surface projecting upward from the base section and having an upright outer surface opposite the inner surface;

the base portion, the first upright wall, and the second upright wall cooperating to form a mechanic's tool holding portion;

a missing mechanic's tool indicator disposed at the base section, the missing mechanic's tool indicator being of a color unrelated to the color of the mechanic's tool, wherein the missing mechanic's tool indicator is visibly blocked from sight by the mechanic's tool when the mechanic's tool is engaged and held by the mechanic's tool holding portion and is visible to sight when the mechanic's tool is removed from the mechanic's tool holding portion;

at least one tongue extending longitudinally along the height of the outer surface of the first upright wall and projecting outwardly away from the outer surface of the first upright wall;

at least one tongue receiving groove recess extending longitudinally along the height of the second upright wall and extending inwardly from the upright outer surface of the second upright wall to be recessed into the second upright wall; and wherein the at least one tongue engageable in locking relationship with the at least one groove of a first adjacent holder for mechanic's tools to prevent disengagement of the holder with the first adjacent holder, and the at least one tongue receiving groove engageable in locking relationship with the at least one tongue of a second adjacent holder for mechanic's tools to prevent disengagement of the holder.

2. The mechanic's tool holder of claim 1, further comprising a magnet disposed on a bottom surface of the base section to magnetically connect the mechanic's tool holder to a metal surface.

3. The mechanics tool holder of claim 1, comprising two elongated tongues extending longitudinally along the height of the outer surface of the first upright wall in parallel relationship to each other, the two tongues having a shape to correspond to and fit within corresponding elongate tongue receiving grooves extending longitudinally along the height of the outer surface of the second upright wall of a first adjacent holder.

4. The mechanics tool holder of claim 1, further comprising:

a central upright wall projecting upwardly from the base section at a location between the first upright wall and the second upright wall, the center upright wall comprising a first center upright wall facing the first upright wall, wherein the body further comprises a central upright wall and a missing mechanic's tool color indicator, wherein:

the center upright wall extends from the body, and is located between the first upright wall and the second upright wall, the center upright wall has a first center upright wall surface and a second center upright wall surface, the first center upright wall inclined surface faces the first upright wall to cooperatively define a first mechanic's tool holding portion between the first center upright wall and the first upright wall, the second center upright wall faces the second upright wall so as to cooperatively define a second mechanic's tool holding portion between the second center upright wall surface and the second upright wall; and a missing mechanic's tool indicator is disposed between the second upright wall and the central upright wall, wherein the missing mechanic's tool indicator is visibly blocked from sight by the mechanic's tool when the mechanic's tool is engaged and held by the second mechanic's tool holding portion, and the missing mechanic's tool indicator is visible to sight when the mechanic's tool is removed from the second mechanic's tool holding portion.

5. A mechanic's tool holder, comprising:

a base section;

a first upright wall extending upward from the base section, the first upright wall having an inner surface and an outer surface opposite to the inner surface;

a second upright wall is spaced from the first upright wall and extending upward from the base section, and the second upright wall having an inner surface and an upright outer surface opposite to the inner surface;

a center upright wall extending upward from the base section and located between the first upright wall and the second upright wall, the center upright wall has a first center upright wall surface and a second center upright wall surface, and the first center upright wall surface faces he first upright wall so as to cooperatively define a first mechanic's tool holding portion between the first center upright wall surface and the first upright wall, and the second center upright wall surface faces the second upright wall so as to cooperatively define a second mechanic's tool holding portion between the second center upright wall surface and the second upright wall, a first missing mechanic's tool indicator is disposed at the base section between the first upright wall and the center upright wall, wherein the first missing mechanic's tool indicator is visibly blocked from sight by the mechanic's tool when the mechanic's tool is engaged and held by the first mechanic's tool holding portion, and the first missing mechanic's tool color indicator is visible to sight when the mechanic's tool is removed from the first mechanic's tool holding portion;

a second missing mechanic's tool indicator is disposed at the base portion of the body between the second upright wall and the center upright wall, wherein the second missing mechanic's tool indicator is visibly blocked from sight by the mechanic's tool when the mechanic's tool is engaged and held by the second mechanic's tool holding portion, and the second missing mechanic's tool indicator is visible to sight when the mechanic's tool is removed from the second mechanic's tool holding portion;

at least one elongate tongue projects outwardly away from the outer surface of the first upright wall longitudinally and extends upwardly along substantially the full height of the outer surface of the first upright wall;

at least one elongate tongue receiving locking groove recesses from the upright outer surface of the second upright wall toward the inner surface of the second upright wall, and extends upwardly along substantially the full height of the outer surface of the second upright wall; and the at least one elongate tongue extending along the outer surface of the first upright wall is engageable in locking relationship with the at least one groove of a first adjacent holder for mechanic's tools to prevent disengagement of the holder and the first adjacent holder, and the at least one elongate tongue receiving groove extending along the outer surface of the second upright wall is engageable in locking relationship with the at least one elongate tongue of a second adjacent holder for mechanic's tools to prevent disengagement of the holder and the second adjacent holder.

6. The mechanic's tool holder of claim 5, further comprising a magnet disposed on a bottom surface of the base section to magnetically connect the mechanic's tool holder to a metal surface.

7. The mechanic's tool holder of claim 5, comprising two elongated tongues extending longitudinally along the height of the outer surface of the first upright wall in parallel relationship to each other, the two tongues have a shape to correspond to and fit within corresponding elongate tongue receiving grooves extending longitudinally along the height of the outer surface of the second upright wall of a first adjacent holder.

* * * * *